(12) United States Patent
Tomeba et al.

(10) Patent No.: US 10,999,868 B2
(45) Date of Patent: May 4, 2021

(54) TERMINAL APPARATUS, BASE STATION APPARATUS, AND COMMUNICATION METHOD

(71) Applicants: SHARP KABUSHIKI KAISHA, Sakai (JP); FG INNOVATION COMPANY LIMITED, Tuen Mun (HK)

(72) Inventors: Hiromichi Tomeba, Sakai (JP); Ryota Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 235 days.

(21) Appl. No.: 16/313,098

(22) PCT Filed: Jun. 27, 2017

(86) PCT No.: PCT/JP2017/023491
§ 371 (c)(1),
(2) Date: Dec. 24, 2018

(87) PCT Pub. No.: WO2018/008458
PCT Pub. Date: Jan. 11, 2018

(65) Prior Publication Data
US 2019/0239253 A1  Aug. 1, 2019

(30) Foreign Application Priority Data

Jul. 5, 2016 (JP) .............................. JP2016-133250
Jul. 5, 2016 (JP) .............................. JP2016-133251

(51) Int. Cl.
*H04W 74/08* (2009.01)
*H04W 72/04* (2009.01)
(Continued)

(52) U.S. Cl.
CPC ....... *H04W 74/0825* (2013.01); *H04L 1/0026* (2013.01); *H04L 5/00* (2013.01);
(Continued)

(58) Field of Classification Search
None
See application file for complete search history.

(56) References Cited

U.S. PATENT DOCUMENTS

2015/0092703 A1* 4/2015 Xu .................... H04W 72/0446
 370/329
2016/0036581 A1* 2/2016 Yerramalli .......... H04L 27/2607
 370/280

(Continued)

FOREIGN PATENT DOCUMENTS

WO  2015/174437 A1  11/2015

OTHER PUBLICATIONS

IMT Vision—Framework and overall objectives of the future development of IMT for 2020 and beyond, Recommendation ITU-R M.2083-0, Sep. 2015.
(Continued)

*Primary Examiner* — Rebecca E Song
(74) *Attorney, Agent, or Firm* — ScienBiziP, P.C.

(57) ABSTRACT

To provide a base station apparatus, a terminal apparatus, and a communication method for achieving a high frequency efficiency while coexisting with other radio access system under environment where multiple frame formats are multiplexed for use. A base station apparatus according to the present invention comprises a receiver that performs carrier sense on the second frequency band based on a predetermined frame configuration among a plurality of frame configurations to obtain the second frequency band during a predetermined duration, and a transmitter that notifies control information concerning the predetermined frame con-
(Continued)

figuration and transmits a downlink signal to the terminal apparatus during the predetermined duration based on the predetermined frame configuration.

6 Claims, 17 Drawing Sheets

(51) Int. Cl.
    *H04W 74/00*     (2009.01)
    *H04L 1/00*     (2006.01)
    *H04L 5/00*     (2006.01)

(52) U.S. Cl.
    CPC ... *H04W 72/0446* (2013.01); *H04W 72/0453* (2013.01); *H04W 74/006* (2013.01); *H04W 74/0808* (2013.01)

(56) References Cited

U.S. PATENT DOCUMENTS

| | | |
|---|---|---|
| 2017/0094681 A1 | 3/2017 | Takeda et al. |
| 2017/0142694 A1* | 5/2017 | Yerramalli ............ H04L 5/0053 |

OTHER PUBLICATIONS

Ericsson et al., RP-140259, Study on Licensed-Assisted Access using LTE, 3GPPTSG RAN Meeting #63, Mar. 2014.

* cited by examiner

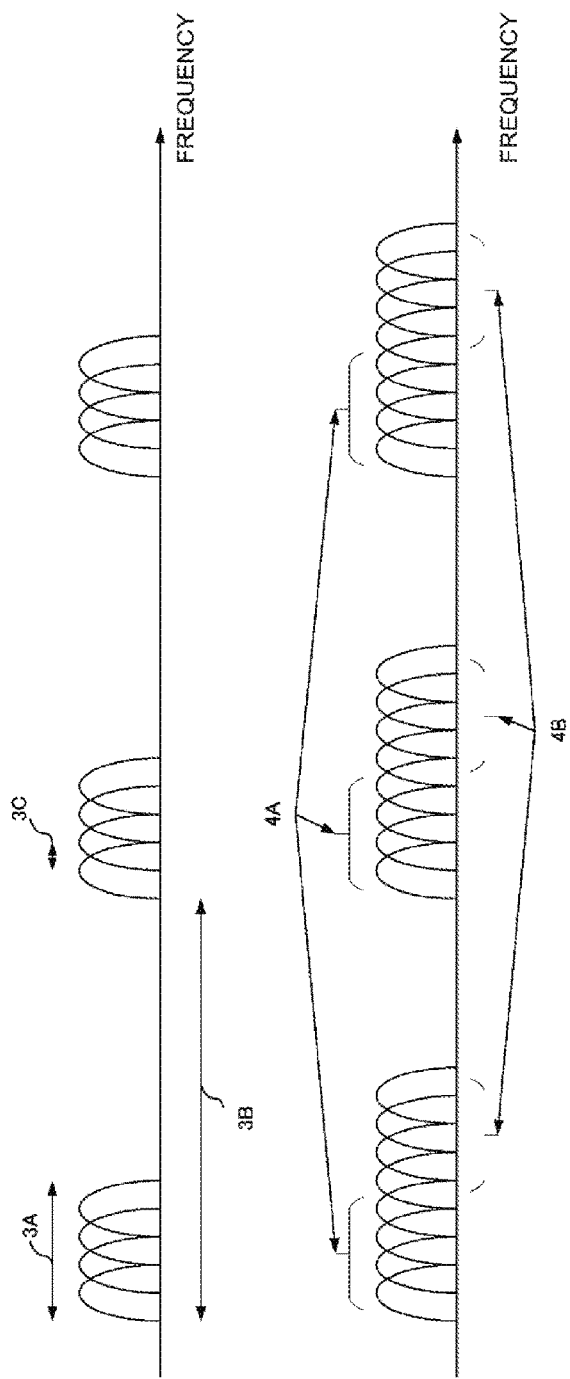

| Channel access priority class | $m_p$ | $CW_{min,p}$ | $CW_{max,p}$ | MCOT |
|---|---|---|---|---|
| 1 | 1 | 3 | 7 | 2 ms |
| 2 | 1 | 7 | 15 | 15 ms |
| 3 | 3 | 15 | 63 | 8 ms or 10 ms |
| 4 | 7 | 15 | 1023 | 8 ms or 10 ms |

FIG. 13

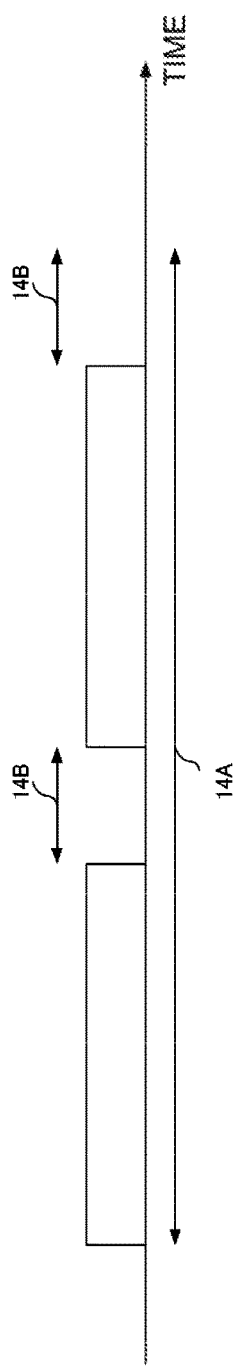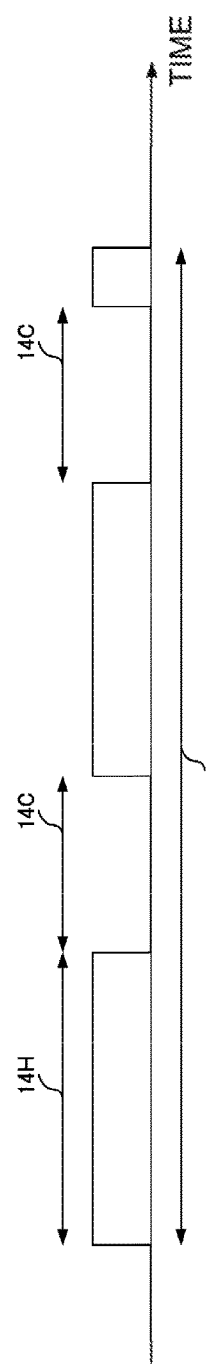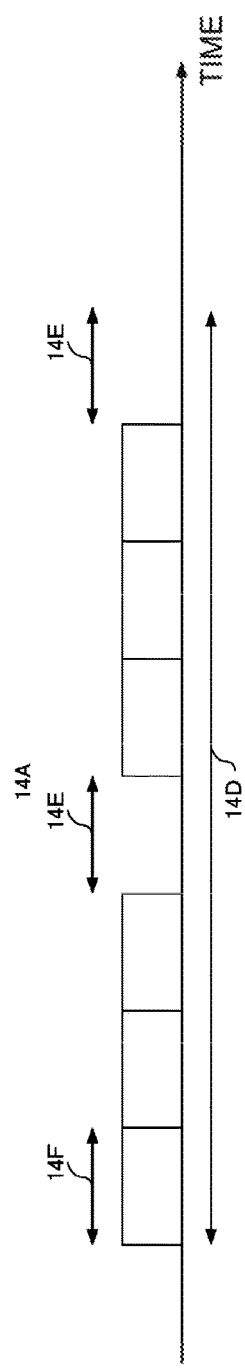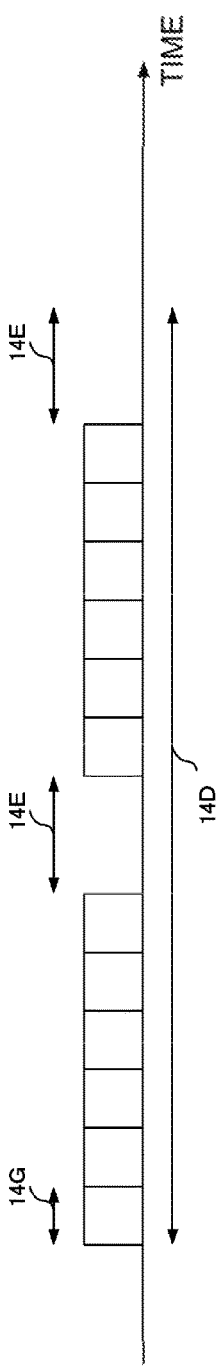

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

In a communication system such as Long Term Evolution (LTE) or LTE-Advanced (LTE-A) of which specifications have been defined by the Third Generation Partnership Project (3GPP), the communication area can be widened by taking a cellular configuration in which areas covered by base station apparatuses (base stations, transmission stations, transmission points, downlink transmission devices, uplink reception devices, a group of transmit antennas, a group of transmit antenna ports, component carriers, eNodeB, access points, AP) or transmission stations equivalent to the base station apparatuses are arranged in the form of multiple cells (Cells) being linked together. The base station apparatus is connected with terminal apparatuses (reception stations, reception points, downlink reception devices, uplink transmission devices, a group of receive antennas, a group pf receive antenna ports, UE, stations, STA). In such a cellular configuration, frequency efficiency can be improved by using the same frequency among neighboring cells or sectors.

In LTE/LTE-A, frame formats are defined for frequency division duplex, time division duplex, and licensed assisted access. For example, the LTE/LTE-A base station apparatus and terminal apparatus using the frequency division duplex are independent of a communication bandwidth and can always perform communication using a common frame format.

With the aim to start commercial services around 2020, research and development activities for the fifth generation mobile communications system (5G system) have been actively carried out. In recent years, the International Telecommunication Union Radio communications Sector (ITU-R) which is an international standardization institution has reported a vision recommendation on a standard scheme for the 5G system (International mobile telecommunication-2020 and beyond: IMT-2020) (see NPL 1).

In order to meet various requirements represented by three major usage scenarios (Enhanced mobile broadband (EMBB), Enhanced Massive machine type communication (eMTC), Ultra-reliable and low latency communication (URLLC)), the 5G system is expected to combine various frequency bands to manage a radio access network. For this reason, the 5G system, unlike the conventional LTE/LTE-A, is expected to multiplex different frame formats although the same access scheme is used.

An important issue is to secure a frequency resource for the communication system to cope with a rapid increase in data traffic. The frequency band (frequency range) assumed by the communication system providing a cellular service represented by LTE until now has been a frequency band called a so-called licensed band which is licensed to a wireless operator by a country or region to which the wireless operator provides a service, and therefore, available frequency bands are limited.

In response to this, in recent years, a cellular service using a frequency band called a so-called unlicensed band which does not require to be licensed (certificated) by a country or region has been discussed. For example, in the LTE system, such a cellular service has been specified as a License assisted access (LAA) (see NPL 2). In the 5G system also where the data traffic is expected to rapidly increase more and more, the unlicensed band is assumed to be required to be actively utilized.

CITATION LIST

Non Patent Literature

NPL 1: "IMT Vision—Framework and overall objectives of the future development of IMT for 2020 and beyond," Recommendation ITU-R M. 2083-0, September 2015.

NPL 2: RP-140259, "Study on Licensed-Assisted Access using LTE," 3GPP TSG RAN Meeting #63, March, 2014.

SUMMARY OF INVENTION

Technical Problem

However, since the unlicensed band is also shared by other radio access systems represented by a radio local area network, coexistence with other radio access systems is necessary for the 5G system to utilize the unlicensed band. However, in the 5G system where it is assumed that multiple frame formats are multiplexed and used, a symbol length is different for each frame format or an occupied bandwidth is different per a subcarrier, so a problem occurs that unnecessary interference is given to other radio access systems and a frequency usage efficiency of the unlicensed band itself is considerably degraded.

The present invention has been made in consideration of such a circumstance, and has an object to provide a base station apparatus, a terminal apparatus, and a communication method that achieve coexistence with other radio access systems and realize a high frequency usage efficiency under an environment where multiple frame formats are multiplexed and used.

Solution to Problem

To address the above-mentioned drawbacks, a base station apparatus, a terminal apparatus, and a communication method according to an aspect of the present invention are configured as follows.

(1) Specifically, a base station apparatus that is an aspect of the present invention is a base station apparatus for communicating with a terminal apparatus in a communication system that applies a communication method applied to a first frequency band used in a dedicated manner to a second frequency band different from the first frequency band, the base station apparatus including: a receiver configured to perform carrier sense on the second frequency, band based on a prescribed frame structure among multiple frame structures to obtain the second frequency band during a prescribed duration; and a transmitter configured to notify control information regarding the prescribed frame structure and transmit a downlink signal to the terminal apparatus during the prescribed duration based on the prescribed frame structure.

(2) The base station apparatus that is an aspect of the present invention is described in the above (1), wherein in a case that the transmitter transmits a downlink signal to the terminal apparatus during the prescribed duration, based on a frame structure different from the prescribed frame structure, the receiver performs carrier sense with random back-off on the second frequency band, based on the different frame structure.

(3) The base station apparatus that is an aspect of the present invention is described in the above (1), wherein a length of the prescribed duration is associated with the prescribed frame structure.

(4) The base station apparatus that is an aspect of the present invention is described in the above (1), wherein priority information of the carrier sense is configured for each of the multiple frame structures.

(5) The base station apparatus that is an aspect of the present invention is described in the above (1), wherein in a case that the transmitter transmits multiple component carriers in the second frequency band, the transmitter configures the same frame structure for the multiple component carriers.

(6) A terminal apparatus that is an aspect of the present invention is a terminal apparatus for communicating with a base station apparatus in a communication system that applies a communication method applied to a first frequency band used in a dedicated manner to a second frequency band different from the first frequency band, the base station apparatus including: a receiver configured to receive control information including information indicating at least one frame structure of multiple frame structures from the base station apparatus; and a transmitter configured to perform carrier sense for a prescribed time period in a case of transmitting an uplink signal in a frame structure the same as the frame structure of the received control information, and performs carrier sense with random backoff in a case of transmitting an uplink signal in a frame structure different from the frame structure of the received control information.

(7) A communication method that is an aspect of the present invention is a communication method for a base station apparatus for communicating with a terminal apparatus in a communication system that applies a communication method applied to a first frequency band used in a dedicated manner to a second frequency band different from the first frequency band, the communication method comprising the steps of: performing carrier sense on the second frequency, band based on a prescribed frame structure among multiple frame structures to obtain the second frequency band during a prescribed duration; and notifying control information regarding the prescribed frame structure and transmitting a downlink signal to the terminal apparatus during the prescribed duration based on the prescribed frame structure.

Advantageous Effects of Invention

According to an aspect to the present invention, a radio access network is realized which achieves coexistence with other radio access systems and realizes a high frequency usage efficiency under an environment where multiple frame formats are multiplexed and used, and therefore, communication quality of the communication system can be extremely improved.

BRIEF DESCRIPTION OF DRAWINGS

FIG. 10A and FIG. 10B are diagrams illustrating examples of a signal spectrum according to an aspect of the present embodiment.

FIG. 13 is a diagram illustrating an example of a classification of a medium occupancy time according to an aspect of the present embodiment.

FIGS. 14A to 14D are diagrams illustrating examples of the frame format according to an aspect of the present embodiment.

DESCRIPTION OF EMBODIMENTS

A communication system according to the present embodiment includes a base station apparatus (a transmission unit, cells, a transmission point, a group of transmit antennas, a group of transmit antenna ports, component carriers, eNodeB, access points, AP, radio routers, relays, communication devices) and terminal apparatuses (a terminal, a mobile terminal, a reception point, a reception terminal, a reception unit, a group of receive antennas, a group of receive antenna ports, UE, station, STA).

In the present embodiment, "X/Y" includes the meaning of "X or Y". In the present embodiment, "X/Y" includes the meaning of "X and Y". In the present embodiment, "X/Y" includes the meaning of "X and/or Y".

1. First Embodiment

Figure 1:
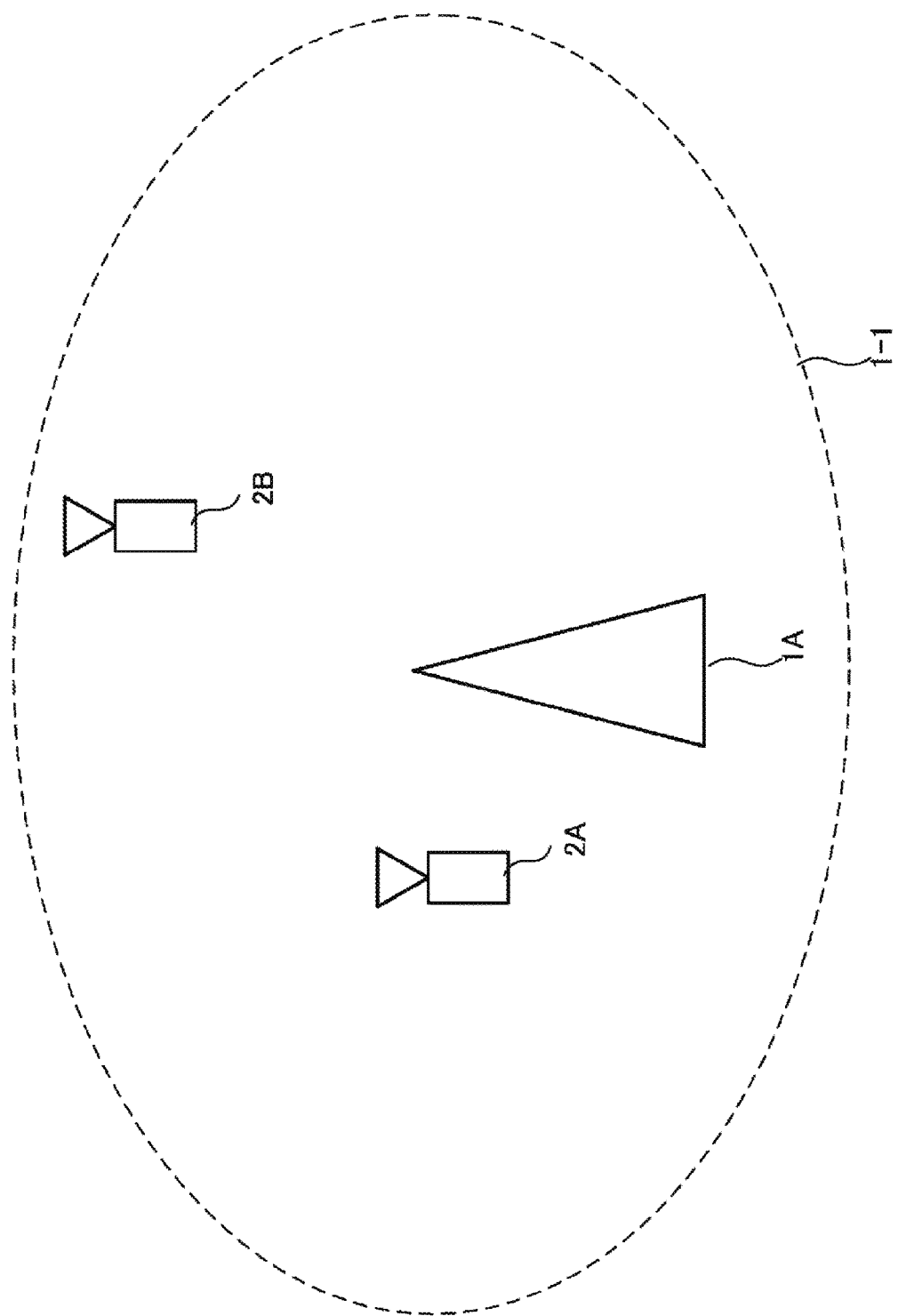
FIG. 1 is a diagram illustrating an example of a communication system according to an aspect of the present embodiment.

FIG. 1 is a diagram illustrating an example of a communication system according to the present embodiment. As illustrated in FIG. 1, the communication system according to the present embodiment includes a base station apparatus 1A (also referred to simply as a base station apparatus 1) and terminal apparatuses 2A and 2B (also collectively referred to simply as terminal apparatuses 2). A coverage 1-1 is a range (a communication area) in which the base station apparatus 1A can connect to the terminal apparatuses. The communication system according to the present embodiment can include multiple base station apparatuses (for example, a base station apparatus 1B), and three or more terminal apparatuses.

In FIG. 1, the following uplink physical channels are used for uplink radio communication from the terminal apparatuses 2 to the base station apparatus 1A. The uplink physical channels are used for transmitting information output from higher layers.

Physical Uplink Control Channel (PUCCH)
Physical Uplink Shared Channel (PUCCH)
Physical Random Access Channel (PRACH)

The PUCCH is used to transmit Uplink Control Information (UCI). The uplink control information includes a positive acknowledgement (ACK) or a negative acknowledgement (MACK) (ACK/NACK) for downlink data (a downlink transport block or a Downlink-Shared Channel (DL-SCH)). The ACK/NACK for the downlink data is also referred to as HARQ-ACK or HARQ feedback.

Here, the uplink control information includes Channel State Information (CSI) for the downlink. The uplink control information includes a Scheduling Request (SR) used to request an Uplink-Shared Channel (UL-SCH) resource. The channel state information refers to a rank indicator (RI) specifying a suited spatial multiplexing number, a precoding matrix indicator (PMI) specifying a suited precoder, a channel quality indicator (CQI) specifying a suited transmission rate, and the like.

The channel quality indicator (hereinafter, referred to as a CQI value) can be a suited modulation scheme (for example, QPSK, 16QAM, 64QAM, 256QAM, or the like) and a suited code rate in a prescribed band (details of which will be described later). The CQI value can be an index (CQI Index) determined by the above change scheme, coding rate, and the like. The CQI value can take a value determined beforehand in the system.

The rank indicator and the precoding quality indicator can take the values determined beforehand in the system. Each of the rank indicator, the precoding matrix indicator, and the like can be an index determined by the spatial multiplexing number, the precoding matrix information, or the like. Note that values of the rank indicator, the precoding matrix indicator, and the channel quality indicator CQI are collectively referred to as CSI values.

The PUSCH is used to transmit uplink data (an uplink transport block, UL-SCH). Furthermore, the PUSCH may be used to transmit the ACK/NACK and/or channel state information along with the uplink data. In addition, the PUSCH may be used to transmit the uplink control information only.

The PUSCH is used to transmit an RRC message. The RRC message is information/signal that is processed in a Radio Resource Control (RRC) layer. Further, the PUSCH is used to transmit a MAC Control Element (CE). Here, the MAC CE is information/signal that is processed (transmitted) in a Medium Access Control (MAC) layer.

For example, a power headroom may be included in the MAC CE and may be reported via the PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used to transmit information output from higher layers, but is used by the physical layer. The uplink reference signal includes a Demodulation Reference Signal (DMRS) and a Sounding Reference Signal (SRS).

The DMRS is associated with transmission of the PUSCH or the PUCCH. For example, the base station apparatus 1A uses the DMRS in order to perform channel compensation of the PUSCH or PUCCH. The SRS is not associated with the transmission of the PUSCH or the PUCCH. For example, the base station apparatus 1A uses the SRS to measure an uplink channel state. The base station apparatus 1A can notify SRS configuration information with higher layer signaling or a DCI format described later. The base station apparatus 1A can notify DMRS configuration information with higher layer signaling or a DCI format described later.

Multiple ways to be triggered are defined in the SRS. For example, there are trigger type 0 that is triggered by higher layer signaling, and trigger type 1 that is triggered by downlink control information described later.

The SRS includes a Cell specific SRS (Common SRS) and a UE-specific SRS (Dedicated SRS). The UE-specific SRS includes a SRS that is periodically transmitted (UE-specific periodic SRS), and a SRS that is aperiodically transmitted based on a trigger (UE-specific aperiodic SRS).

In the Common SRS, a transmission bandwidth (srs-BandwidthConfig) and a transmitted subframe (srs-SubframeConfig) are specified by higher layer signaling or the downlink control information described later. In a case that a predetermined parameter (for example, ackNackSRS-SimultaneousTransmission) is False, the Common SRS is not transmitted in a subframe in which the PUCCH including at least one of the HARQ-ACK and the SR is included. On the other hand, in a case that a prescribed parameter (for example, ackNackSRS-SimultaneousTransmission) is True, the Common SRS can be transmitted in a subframe in which the PUCCH including at least one of the HARQ-ACK and the SR is included.

The Dedicated SRS is configured with a transmission bandwidth, a hopping bandwidth (srs-HoppingBandwidth), a frequency allocation starting position (freqDomainPosition), a transmission duration (Duration) (Single transmission or indefinite transmission), a transmission period (srs-ConfigIndex), a cyclic shift amount (cyclicShift) provided to a SRS signal sequence, and a position of SRS in a form of teeth of a comb (transmissionComb) by higher layer signaling or the downlink control information described later.

The SRS can be transmitted through multiple antenna ports. The number of transmit antenna ports is configured by higher layer signaling. The UE configured with SRS transmission in multiple antenna ports is required to transmit to a serving cell the SRS with one SC-FDMA symbol in the same subframe from the all configured transmit antenna ports. In this case, the all SRS transmitted from the configured transmit antenna ports are configured with the same transmission bandwidth and the same frequency allocation starting position.

The UE not configured with multiple Transmission advance groups (TAGS) is not allowed to transmit the SRS so long as the SRS does not overlap the PUSCH in the same symbol.

For a serving cell of TDD, in a case that an UpPTS of the serving cell includes a single SC-FDMA symbol, the UE can use the SC-FDMA symbol for the SRS transmission. In a case that the UpPTS of the serving cell includes two SC-FDMA symbols, the UE can use both of the two SC-FDMA symbols for the SRS transmission. For the SRS of trigger type 0, both of the two SC-FDMA symbols can be configured to the SRS for the same UE.

In FIG. 1, the following downlink physical channels are used for the downlink radio communication from the base station apparatus 1A to the terminal apparatus 2A. The downlink physical channels are used for transmitting information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is shared by the terminal apparatuses. The PCFICH is used for transmission of information indicating a region (for example, the number of OFDM symbols) to be used for transmission of PDCCH.

The PHICH is used for transmission of an ACK/NACK with respect to the uplink data (a transport block, a codeword) received by the base station apparatus 1A. In other words, the PHICH is used for transmission of a HARQ indicator (HARQ feedback) indicating an ACK/NACK with respect to the uplink data. Note that an ACK/NACK is also called a HARQ-ACK. The terminal apparatus 2A reports an ACK/NACK having been received to higher layers. The ACK/NACK refers to an ACK indicating a successful reception, a NACK indicating an unsuccessful reception, and a DTX indicating that no corresponding data is present. In a case that PHICH for the uplink data is not present, the terminal apparatus 2A reports an ACK to higher layers.

The PDCCH and the EPDCCH are used to transmit the Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. Here, the DCI format for the uplink is also referred to as uplink grant (or uplink assignment).

Further, the DCI format for the uplink can be used to request downlink Channel State Information (CSI), which is also called reception quality information. The Channel State Information refers to the Rank Indicator (RI) specifying a suited number of spatial multiplexing, the Precoding Matrix Indicator (PMI) specifying a suited precoder, the Channel Quality Indicator (CQI) specifying a suited transmission rate, Precoding type Indicator (PTI) and the like.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting channel state information (Periodic CSI). The CSI feedback report can be used for a mode configuration (CSI report mode) to periodically report the channel sate information.

For example, the CSI feedback report can be used for a configuration indicating an uplink resource to report Aperiodic Channel State Information (Aperiodic CSI). The CSI feedback report can be used for a mode configuration (CSI report mode) to aperiodically report the channel state information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PDSCH resource is scheduled in accordance with the uplink grant, the terminal apparatus transmits uplink data and/or uplink control information on the scheduled PUSCH.

The PDSCH is used to transmit downlink data (a downlink transport block, DL-SCH). The PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

The PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signalling). In other words, user-equipment-specific information (unique to user equipment) is transmitted using a message dedicated to the given terminal apparatus. The PDSCH is used for transmission of MAC CE.

Here, the RRC message and/or MAC CE is also referred to as higher layer signaling.

The PDSCH can be used to request the downlink channel state information. The PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting channel state information (Periodic CSI). The CSI feedback report can be used for a mode configuration (CSI report mode) to periodically report the Channel State Information.

The type of the downlink CSI feedback report includes wideband CSI (for example, Wideband CSI) and narrowband CSI (for example, Subband CSI). The wideband CSI calculates one piece of channel state information for the system band of a cell. The narrowband CSI divides the system band into prescribed units, and calculates one piece of channel state information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The downlink reference signal is used for the terminal apparatus to perform channel compensation on the downlink physical channel. For example, the downlink reference signal is used for the terminal apparatus to calculate the downlink channel state information.

Here, the Downlink Reference Signal includes a Cell-specific Reference Signal (CRS), a UE-specific Reference Signal (URS) or a terminal-specific reference signal, a Demodulation Reference Signal (DMRS), a Non-Zero Power Chanel State Information-Reference Signal (NZP CSI-RS), and a Zero Power Chanel State Information-Reference Signal (ZP CSI-RS).

The CRS is transmitted in all bands of a subframe and is used to perform demodulation of PBCH/PDCCH/PHICH/PCFICH/PDSCH. The URS relating to PDSCH is transmitted in a subframe and a band that are used for transmission of the PDSCH to which the URS relates, and is used to demodulate the PDSCH to which the URS relates.

The DMRS relating to the EPDCCH is transmitted in a subframe and a band that are used for transmission of the EPDCCH to which the DMRS relates. The DMRS is used to demodulate EPDCCH to which the DMRS relates.

A resource for NZP CSI-RS is configured by the base station apparatus 1A. For example, the terminal apparatus 2A performs signal measurement (channel measurement), using the NZP CSI-RS. A resource for ZP CSI-RS is configured by the base station apparatus 1A. With zero output, the base station apparatus 1A transmits the ZP CSI-RS. The terminal apparatus 2A performs interference measurement in a resource to which the NZP CSI-RS corresponds, for example.

A Multimedia Broadcast multicast service Single Frequency Network (MBSFN) RS is transmitted in all bands of the subframe used for transmitting the PMCH. The MBSFN RS is used to demodulate the PMCH. The PMCH is transmitted on the antenna port used for transmission of the MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer, in the physical layer, the transport block is mapped to a codeword, and coding processing or the like is performed for each codeword.

The base station apparatus can integrate, for the terminal apparatus supporting Career Aggregation (CA), multiple Component Careers (CCs) to communicate for broadband transmission. In Career Aggregation, one Primary Cell (PCell) and one or multiple Secondary Cells (SCells) are configured as a set of serving cells.

In Dual Connectivity (DC), a Master Cell Group (MCG) and a Secondary Cell Group (SCG) are configured as groups of serving cells. The MCG is constituted by a PCell, optionally, with one or multiple SCells. The SCG consists of a Primary SCell (PSCell), optionally, with one or multiple SCells.

Figure 2:
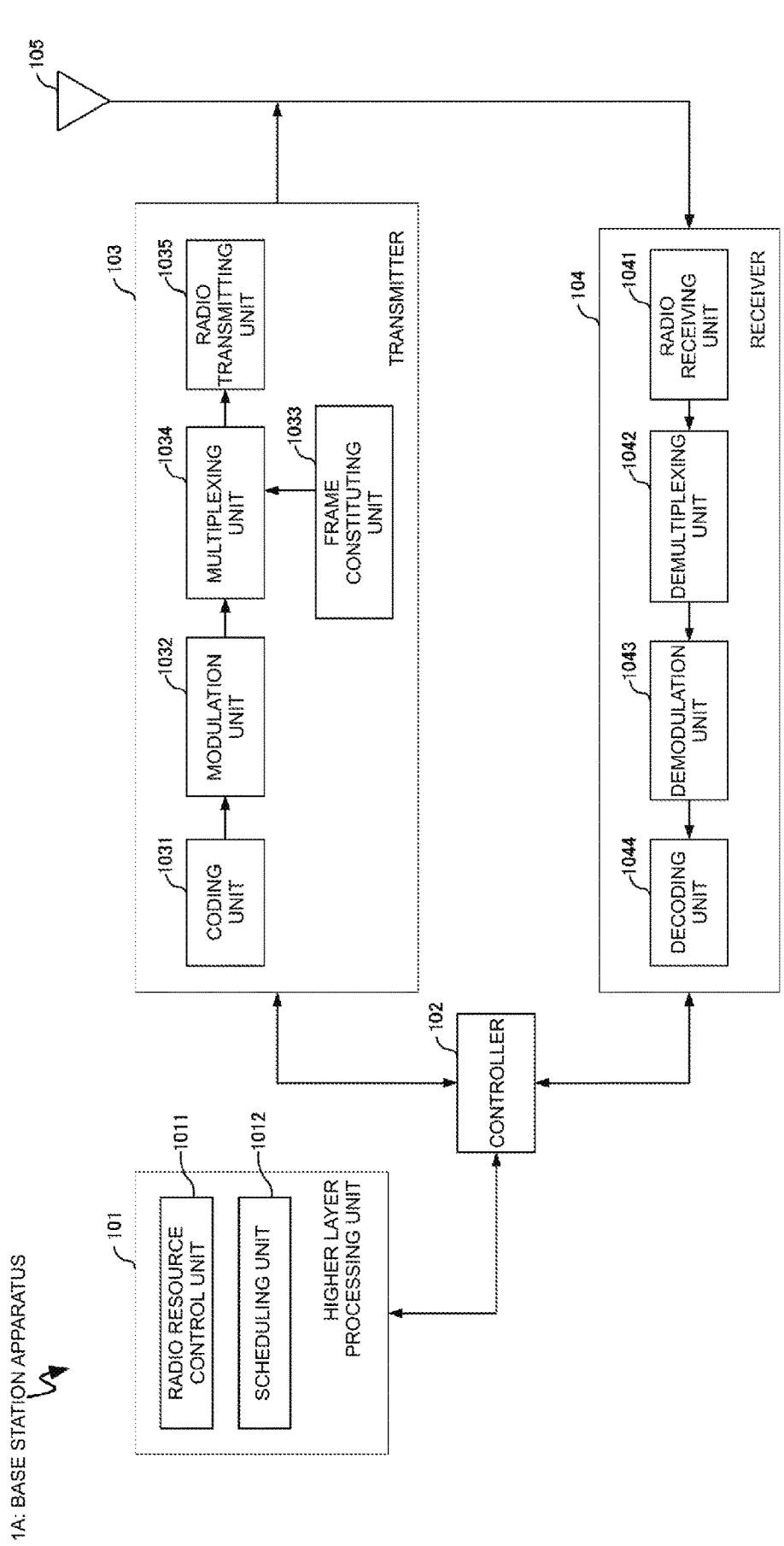
FIG. 2 is a block diagram illustrating a configuration example of a base station apparatus according to an aspect of the present embodiment.

FIG. 2 is a schematic block diagram illustrating a configuration of the base station apparatus 1A according to the present embodiment. As illustrated in FIG. 2, the base station apparatus 1A is configured to include a higher layer processing unit (higher layer processing step) 101, a controller (controlling step) 102, a transmitter (transmitting step) 103, a receiver (receiving step) 104, and a transmit and/or receive antenna 105. The higher layer processing unit 101 is configured, including a radio resource control unit (radio resource controlling step) 1011 and a scheduling unit (scheduling step) 1012. The transmitter 103 is configured to include a coding unit (coding step) 1031, a modulation unit (modulating step) 1032, a frame constituting unit (frame constituting step) 1033, a multiplexing unit (multiplexing step) 1034, and a radio transmitting unit (radio transmitting step) 1035. The receiver 104 is configured to include a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as UE capability (capability information) or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the stated terminal apparatus transmits information (parameters) indicating whether the prescribed function is supported. In a case that a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) arranged to the downlink PDSCH, system information, the RRC message, the MAC CE, and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates the information to be used for the scheduling of the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2 through the antenna 105.

The coding unit 1031 codes the HARQ indicator, the downlink control information, and the downlink data that are input from the higher layer processing unit 101, in compliance with the predefined coding scheme, such as block coding, convolutional coding, or turbo coding, or in compliance with the coding scheme determined by the radio resource control unit 1011. The modulation unit 1032 modulates the coded bits input from the coding unit 1031, in compliance with the predefined modulation scheme, such as Binary Phase Shift Keying (BPSK), quadrature Phase Shift Keying (QPSK), quadrature amplitude modulation (16QAM), 64QAM, or 256QAM, or in compliance with the modulation scheme determined by the radio resource control unit 2011.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements. Note that the downlink reference signal is generated by the transmitter 103, based on a sequence that is already learned to the terminal apparatus 2A and that is acquired in accordance with a rule prescribed in advance based on the physical cell identity (PCI, cell ID) for identifying the base station apparatus 1A, and the like.

The frame constituting unit 1033 provides a frame structure (frame format, frame structure) of a transmit signal to be generated by the transmitter 103. The operation of the frame constituting unit 1033 will be described below. Note that, the following description is based on the assumption that the transmitter 103 includes the frame constituting unit 1033, but other components may include functions of the frame constituting unit 1033 as noted. For example, the higher layer processing unit 101 may include the functions.

The radio transmitting unit 1035 performs Inverse Fast Fourier Transform (IFFT) on the modulation symbol resulting from the multiplexing or the like, generates an OFDM symbol, attaches a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the antenna 105 for transmission.

In accordance with the control signal input from the controller 102, the receiver 104 demultiplexes, demodulates, and decodes the reception signal received from the terminal apparatus 2A through the antenna 105, and outputs information resulting from the decoding to the higher layer processing unit 101.

In accordance with the control signal input from the controller 102, the receiver 104 demultiplexes, demodulates, and decodes the reception signal received from the terminal apparatus 2A through the antenna 105, and outputs information resulting from the decoding to the higher layer processing unit 101.

The radio receiving unit 1041 converts, by down-converting, an uplink signal received through the antenna 105 into a baseband signal, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) on the signal from which the CP has been removed, extracts a signal in the frequency domain, and outputs the resulting signal to the demultiplexing unit 1042.

The demultiplexing unit 1042 demultipiexes the signal input from the radio receiving unit 1041 into the PUCCH, PUSCH, and the signal such as the uplink reference signal. The demultiplexing is performed based on radio resource allocation information that is determined in advance by the base station apparatus 1A using the radio resource control unit 1011 and that is included in the uplink grant notified to each of the terminal apparatuses 2.

Furthermore, the demultiplexing unit 1042 performs channel compensation of the PUCCH and the PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant to each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case that PUSCH is re-transmitted, the decoding unit 1044 performs the decoding with the coded bits input from the higher layer processing unit 101 and retained in an HARQ butler, and the demodulated coded bits.

Figure 3:
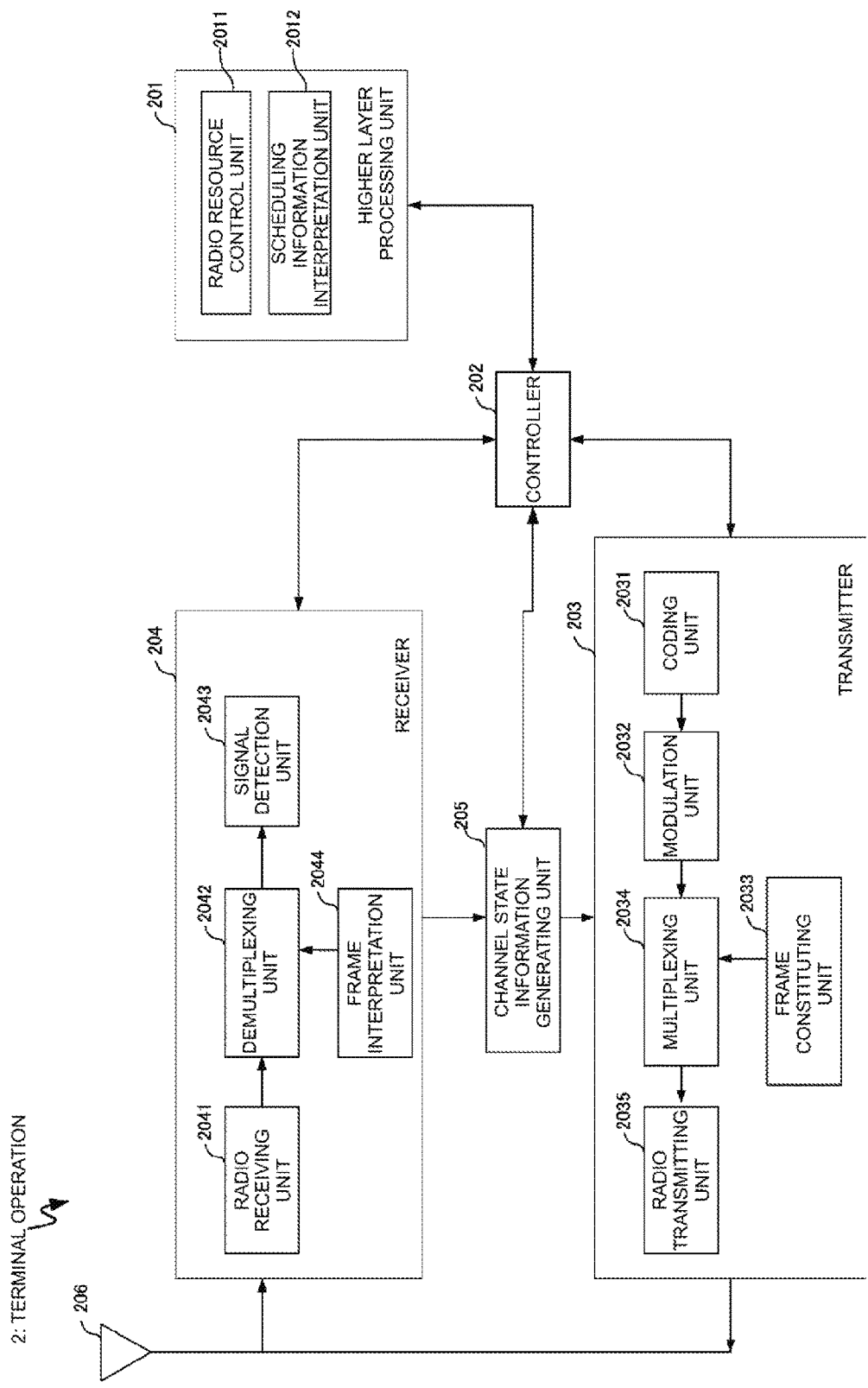
FIG. 3 is a block diagram illustrating a configuration example of a terminal apparatus according to an aspect of the present embodiment.

FIG. 3 is a schematic block diagram illustrating a configuration of the terminal apparatus 2 (terminal apparatus 2A and terminal apparatus 29) according to the present embodiment. As illustrated in FIG. 3, the terminal apparatus 2A is configured, including a higher layer processing unit (higher layer processing step) 201, a controller (controlling step) 202, a transmitter (transmitting step) 203, a receiver (receiving step) 204, a channel state information generating unit (channel state information generating step) 205, and an antenna 206. The higher layer processing unit 201 is configured, including a radio resource control unit (radio resource controlling stop) 2011 and a scheduling information interpretation unit (scheduling information interpreting step) 2012. The transmitter 203 is configured, including a coding unit (coding step) 2031, a modulation unit (modulating step) 2032, a frame constituting unit (frame constituting step) 2033, a multiplexing unit (multiplexing step) 2034, and a radio transmitting unit (radio transmitting step) 2035. The receiver 204 is configured, including a radio receiving unit (radio receiving step) 2041, a demultiplexing unit (demultiplexing step) 2042, a signal detection unit (signal detecting step) 2043, and a frame interpretation unit (frame interpreting step) 2044.

The higher layer processing unit 201 outputs the uplink data (the transport block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmitter 203.

The radio resource control unit 2011 acquires configuration information of the CSI feedback transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates the control information in order to control the receiver 204 and the transmitter 203 in accordance with the scheduling information, and outputs the generated information to the controller 202.

On the basis of the information input from the higher layer processing unit 201, the controller 202 generates a control signal for controlling the receiver 204, the channel state information generating unit 205, and the transmitter 203. The controller 202 outputs the generated control signal to the receiver 204, the channel state information generating unit 205, and the transmitter 203 to control the receiver 204 and the transmitter 203.

The controller 202 controls the transmitter 203 to transmit the CSI generated by the channel state information generating unit 205 to the base station apparatus.

In accordance with the control signal input from the controller 202, the receiver 204 demultiplexes, demodulates, and decodes a reception signal received from the base station apparatus 1A through the antenna 206, and outputs the resulting information to the higher layer processing unit 201.

The radio receiving unit 2041 converts, by down-converting, a downlink signal received through the antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform on the signal from which the CP has been removed, and extracts a signal in the frequency domain.

The frame interpretation unit 2044 interprets the frame structure in a signal transmitted from the base station apparatus 1. The frame interpretation unit 2044 can interpret the frame structure in blind detection. For example, the frame interpretation unit 2044 can detect a position of resource at which information at least indicating the frame structure in blind detection in the resource allocation of the frame structure, and interpret the frame structure, based on the information transmitted in the resource. For example, the frame interpretation unit 2044 can acquire, through higher layer signaling such as RRC signaling, the information indicating the frame structure, or the resource position at which the information indicating the frame structure is mapped, or a candidate of the resource position at which the information indicating the frame structure is mapped, and can, based on that information, interpret the frame structure or blind detect the resource position at which information required for interpreting the frame structure is mapped.

The demultiplexing unit 2042 demultiplexes the extracted signal into the PHICH, PDCCH, EPDCCH, PDSCH, and the downlink reference signal. Further, the demultiplexing unit 2042 performs channel compensation of the PHICH, PDCCH, and EPDCCH based on a channel estimation value of the desired signal obtained from the channel measurement, detects the downlink control information, and outputs the information to the controller 202. The controller 202 outputs the PDSCH and the channel estimation value of the desired signal to the signal detection unit 2043.

The signal detection unit 2043, using the PDSCH and the channel estimation value, detects a signal, and outputs the detected signal to the higher layer processing unit 201.

The transmitter 203 generates the uplink reference signal in accordance with the control signal input from the controller 202, codes and modulates the uplink data (the transport block) input from the higher layer processing unit 201, multiplexes the PUCCH, PUSCH, and the generated uplink reference signal, and transmits a result of the multiplexing to the base station apparatus 1A through the antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of the PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme predefined for each channel.

In accordance with the control signal input from the controller 202, the multiplexing unit 2034 rearranges modulation symbols of the PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port. Note that the uplink reference signal is generated by the transmitter 203, based on a sequence acquired according to a rule (formula) prescribed in advance, based on a physical cell identity (PCI, also referred to as a Cell ID or the like) for identifying the base station apparatus 1A, a bandwidth to which the uplink reference signal is mapped, a cyclic shift notified with the uplink grant, a parameter value for generation of a DMRS sequence, and the like.

Like the frame constituting unit 1033 included in the base station apparatus 1A, the frame constituting unit 2033 provides a frame format (frame configuration, frame type, frame form, frame pattern, frame generation method, frame definition) of a transmit signal generated by the transmitter 203, information indicating the frame format, or a frame itself. The operation of the frame constituting unit 2033 will be described below. Note that it is needless to say that another component (e.g., the higher layer processing unit 201) may include the functions of the frame constituting unit 2033.

The radio transmitting unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the antenna 206 for transmission.

The signal detection unit 2043 according to the present embodiment is capable of performing demodulation processing, based on the information regarding a multiplexing mode of the transmit signal addressed to the apparatus itself and information regarding a retransmission mode of the transmit signal addressed to the apparatus itself.

Figure 4:
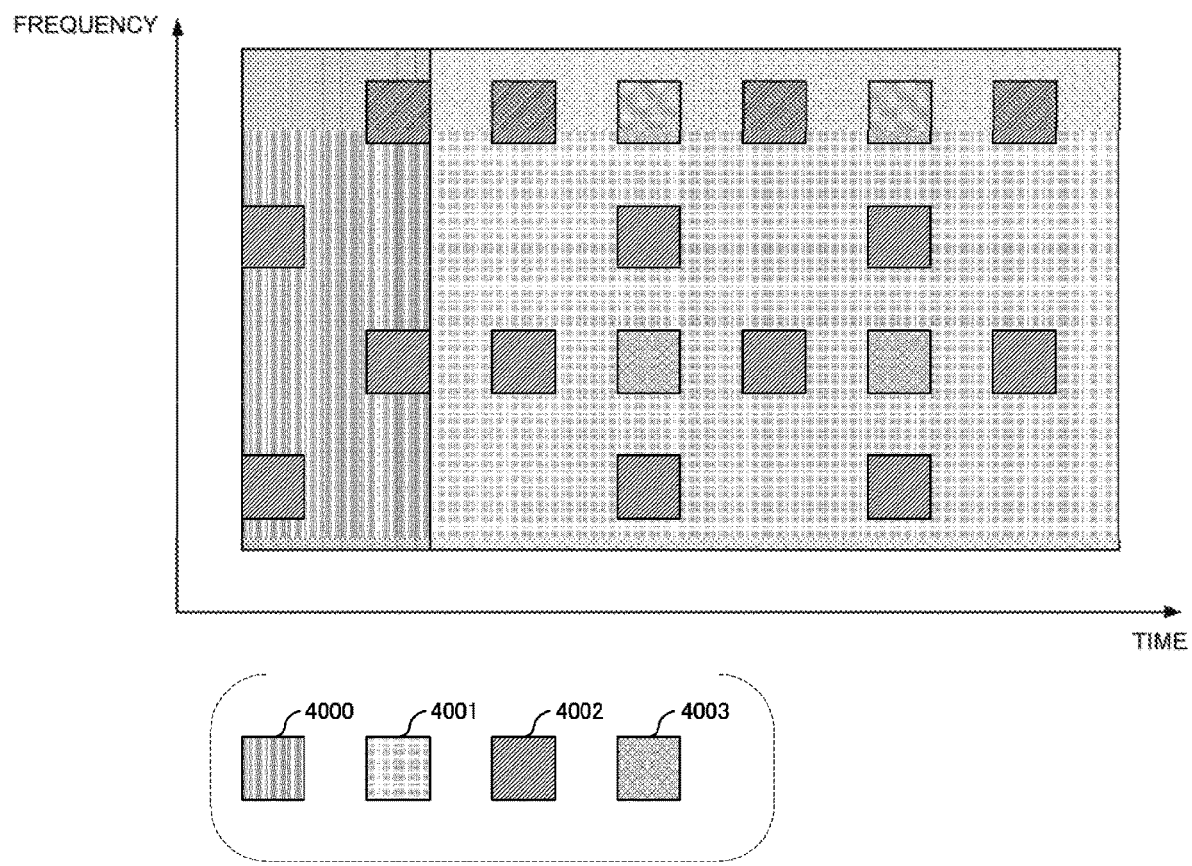
FIG. 4 is a diagram illustrating an example of a frame format according to an aspect of the present embodiment.

FIG. 4 is a schematic diagram illustrating an example of a frame format (first frame format, first frame configuration) of the downlink signal generated by the frame constituting unit 1033 according to the present embodiment. As illustrated in FIG. 4, the first frame format includes at least one of a control signal resource 4000, a data signal resource 4001, a common reference signal (common RS, cell-specific RS) resource 4002, and a specific reference signal (specific RS, demodulation reference signal, demodulation RS, terminal-specific reference signal) resource 4003.

A signal waveform (transmission scheme) for realizing the frame is not limited to any waveform, and may be based on a multicarrier transmission scheme represented by an OFDM transmission or a single carrier transmission scheme represented by an SC-FDMA transmission. For example, in a case of OFDM transmission, the first frame format is constituted by multiple OFDM signals.

The time length (time cycle) and the bandwidth of each resource are not limited to anything. For example, the control signal resource 4000 may be three OFDM symbol lengths in a time length, and 12 subcarriers as a bandwidth.

Figure 5:
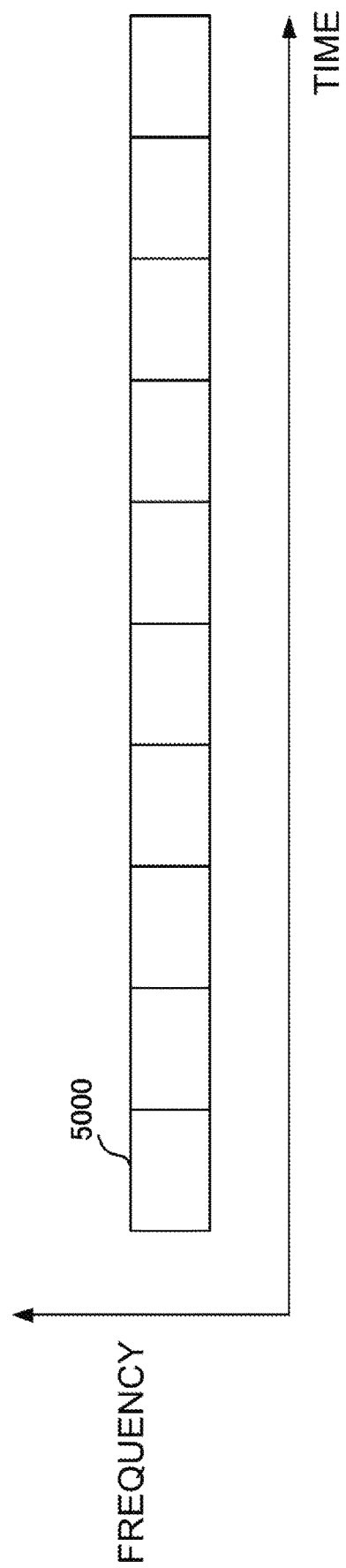
FIG. 5 is a diagram illustrating an example of the frame format according to an aspect of the present embodiment.

The first frame format can utilize aggregation in a time direction and a frequency direction. FIG. 5 is a schematic diagram illustrating an example of the frame format of the downlink signal generated by the frame constituting unit 1033 according to the present embodiment. In the example of FIG. 5, N subframes 5000 are aggregated in the time direction to constitute a single frame. Each subframe 5000 may have a structure of the first frame format illustrated in FIG. 4. Note that, according to the example of FIG. 5, the frequency bandwidth occupied by the frame is the same as the frequency bandwidth of the subframes 5000, but the frame can aggregate the subframes 5000 in the frequency direction. For example, in a case that eight subframes 5000 are allocated in the frequency direction, the frequency bandwidth occupied by the frame is eight times the frequency bandwidth of the subframes 5000. As illustrated in FIG. 5, in a case that the frame is constituted by multiple subframes, the frame format illustrated in FIG. 4 is referred to as a first subframe format, and the frame format illustrated in FIG. 5 is referred to as a first frame format.

Note that, in the present embodiment, bundling multiple subframes to form a single frame is referred to as aggregation, but the frame constituting unit 1033 can originally define the frame format generated by arranging multiple subframes in the time direction and the frequency direction as a single frame format. The number of bundled subframes in the time direction and/or the frequency direction may be configured as a parameter. In this case, this parameter is indicated from the base station apparatus to the terminal apparatus.

Referring back to FIG. 4, the control signal resource 4000 includes control information regarding a downlink signal transmitted by the base station apparatus 1A. The control information is, for example, information transmitted on the PDCCH by the base station apparatus 1A. The control information includes common control information that is broadcast to all the terminal apparatuses connected with the base station apparatus 1A, and specific control information that is individually notified to the terminal apparatuses connected with the base station apparatus 1A.

The data signal resource 4001 includes data signal transmitted by the base station apparatus 1A. The data signal is, for example, information transmitted on the PDSCH by the base station apparatus 1A.

On the common RS resource 4002, the common reference signal (common RS, cell-specific reference signal) transmitted to all the terminal apparatuses connected with the base station apparatus 1A are allocated. The common RS is used by the terminal apparatus 2A to estimate information (e.g., CSI) associated with the reception quality of the apparatus itself. The common RS is also used to demodulate the signal transmitted by the terminal device 2A on the control signal resource 4000. The common RS is also used for the terminal apparatus 2A to detect the base station apparatus 1A. The common RS is also used for the terminal apparatus 2A to perform synchronization processing (sampling synchronization, FFT synchronization) on the signal transmitted from the base station device 1A.

On the specific RS resource 4003, the specific reference signal (specific RS, demodulation reference signal) individually transmitted to the terminal apparatuses 2 connected with the base station apparatus 1A are allocated. The specific RS is associated with the data signal addressed to each terminal apparatus, the data signal being allocated by the base station apparatus 1A on the data signal resource 4001. The terminal apparatus 2A can use the specific RS transmitted to the apparatus itself to demodulate the data signal allocated to the data signal resource 4001 and addressed to the apparatus itself.

In the first frame format, as illustrated in FIG. 4, the data signal resource 4001 can include the common RS resource 4002 and the specific RS resource 4003. The frame constituting unit 1033 can allocate the common RS resource 4002 and the specific RS resource 4003 in a non-contiguous manner in the time direction and the frequency direction. Note that the frame constituting unit 1033 may further provide the control signal resource 4000 in the data signal resource 4001. The control signal resource 4000 provided in the data signal resource 4001 by the frame configuring unit 1033 is, for example, a resource on which the EPDCCH is allocated, the resource may be time-multiplexed or frequency-multiplexed with a resource on which another signal is allocated in the data signal resource 4001.

The frame constituting unit 1033 can further include a synchronization signal resource 4004 and a broadcast signal resource 4007 to the first frame format. On the synchronization signal resource 4004 and the broadcast signal resource 4007, a synchronization signal and a broadcast signal that are broadcast to the terminal apparatus 2 capable of receiving a signal transmitted from the base station apparatus 1A are allocated. The synchronization signal is a signal for the terminal apparatus 2A to perform initial synchronization with a signal transmitted from the base station apparatus 1A, and is, for example, a Primary Synchronization Signal (PSS), or a Secondary Synchronization Signal (SSS). The broadcast signal is a signal for the terminal apparatus 2A to obtain the system information regarding the base station apparatus 1A, and includes, for example, information transmitted by the base station apparatus 1A on the PBCH. The frame constituting unit 1033 is not required to allocate the synchronization signal resource 4004 and the broadcast signal resource 4007 to all the subframes.

The base station apparatus 1A can notify the terminal apparatus 2A of (or indicate to the terminal apparatus 2A) the resource positions to which (or resource candidates to which possibly) the synchronization signal resource 4004 and notification signal resource 4007 are mapped. The base station apparatus 1A and the terminal apparatus 2A can negotiate in advance about the resource positions to which (or the resource candidates to which possibly) the synchronization signal resource 4004 and notification signal resource 4007 are mapped. Here, the information indicating the resource position includes information indicating a time resource (subframe number, OFDM signal number, frame number, slot number, and the like), a frequency resource (subcarrier number, resource block number, frequency band number, and the like), a spatial resource (transmit antenna number, antenna port number, spatial stream number, and the like), a code resource (spread code sequence, code generation formula, code generation seed, and the like) and the like.

In the following description, similar to the above, a case of a description that "the base station apparatus 1A notifies the terminal apparatus 2A of information" also includes a state where the information is shared (or, negotiated) in advance between the base station apparatus 1A and the terminal apparatus 2A unless otherwise specifically described. In general, if the base station apparatus 1A notifies the terminal apparatus 2A of the information, overhead increases, but a radio propagation environment varying from hour to hour can be addressed. On the other hand, if the base station apparatus 1A and the terminal apparatus 2A share the information in advance, the radio propagation environment varying from hour to hour may be difficult to address in some cases, but the overhead decreases.

Figure 6:
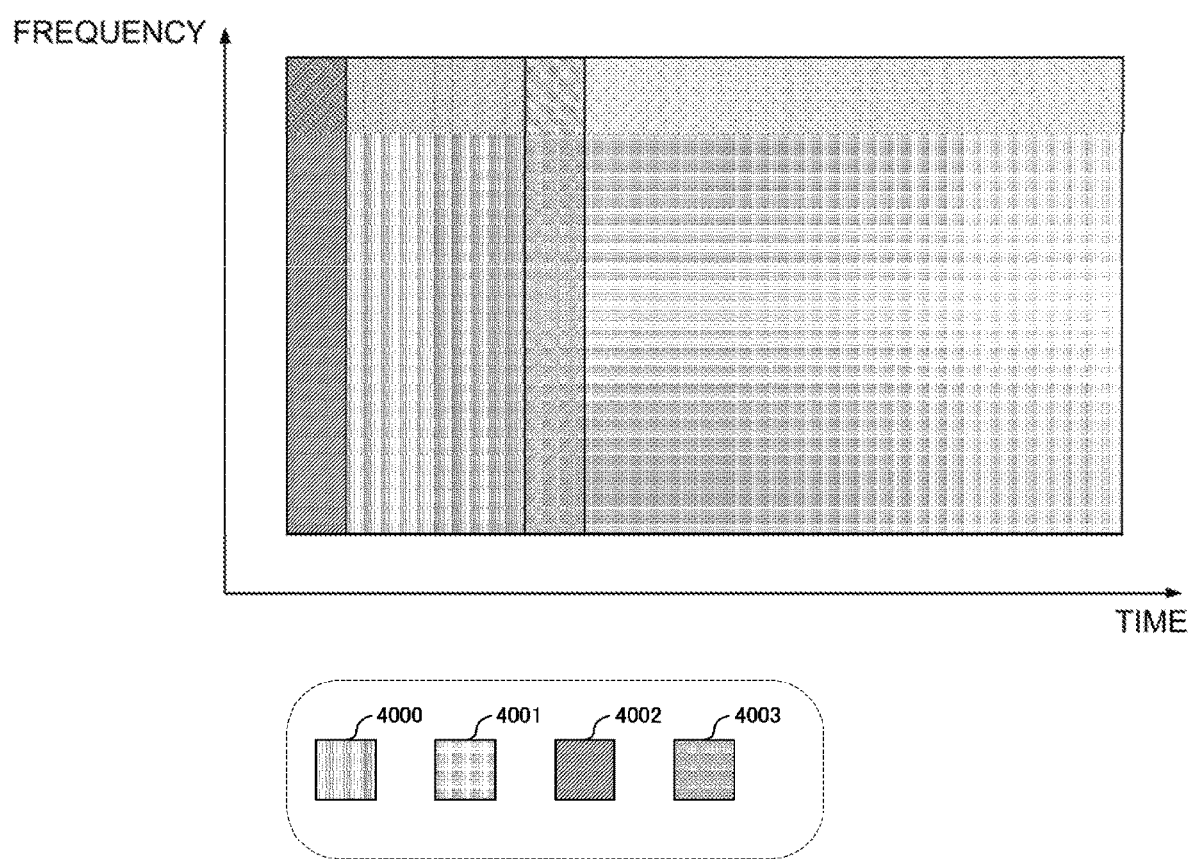
FIG. 6 is a diagram illustrating an example of the frame format according to an aspect of the present embodiment.

FIG. 6 is a schematic diagram illustrating an example of a frame format (second frame format, second frame configuration) of the downlink signal generated by the frame constituting unit 1033 according to the present embodiment. As illustrated in FIG. 6, the second frame format includes at least any one of the control signal resource 4000, the data signal resource 4001, the common RS resource 4002, and the specific RS resource 4003.

In the second frame format, the common RS resource 4002 and the data signal resource 4001 are sequentially allocated in the time direction. Moreover, in the second frame format, the common RS resource 4002 and the control signal resource 4000 are allocated in the first half of the frame. Note that, the specific RS resource 4003 is also allocated in the first half of the frame in the example illustrated in FIG. 6, but the frame constituting unit 1033 can include the specific RS resource 4003 in the data signal resource 4001. In a case that the data signal resource 4001 includes the specific RS resource 4003, the frame constituting unit 1033 can allocate the specific RS resource 4003 within the data signal resource 4001 in a non-contiguous manner in the time direction and the frequency direction.

Note that the frame constituting unit 1033 may further provide the control signal resource 4000 in the data signal resource 4001. The signal allocated on the control signal resource 4000 included in the data signal resource 4001 by the frame configuring unit 1033 is, for example, a signal transmitted on the EPDCCH. The control signal resource 4000 may be time-multiplexed or frequency-multiplexed with a resource on which another signal is allocated in the data signal resource 4001.

The terminal apparatus 2A that receives the transmit signal generated based on the second frame format uses the common RS allocated on the common RS resource 4002 allocated in the first half of the frame, and thus allows initial synchronization processing to be performed with an apparatus that has transmitted the transmit signal. In other words, in the second frame format, the frame constituting unit 1033 according to the present embodiment can include the synchronization signal resource 4004 in the common RS resource 4002. In the second frame format, the frame constituting unit 1033 can share a resource on which the common RS resource 4002 is allocated and a resource on which the synchronization signal resource 4004 is allocated. The frame constituting unit 1033 can use a part of the common RS allocated on the common RS resource 4002 as the synchronization signal.

The frame constituting unit 1033 can use a common resource or use different resources as the resource for allocating the synchronization signal resource 4004 in the first frame format and the resource for allocating the synchronization signal in the second frame format. The base station apparatus 1A can use the same signal or use different resources as the synchronization signal transmitted on the synchronization signal resource 4004 allocated in the first frame format and the synchronization signal transmitted on the synchronization signal resource 4004 allocated in the second frame format. Here, the same signal includes signals in which at least a part of information included in the signals or of radio parameters applied to the signals are common.

In a case that the frame constituting unit 1033 uses the different resources for allocating the synchronization signal resource 4004 (or the broadcast signal resource 4007) in the first frame format and the second frame format, the receiver 204 of the terminal apparatus 2A can perform synchronization processing on multiple resources on which the synchronization signal resource 4004 may be possibly allocated. The receiver 204 of the terminal apparatus 2A can recognize the frame format of the signal received by the apparatus itself, based on a result of the synchronization processing on multiple resources. For example, in a case that the receiving unit 204 of the terminal device 2A performs the synchronization processing on the resource on which the synchronization signal resource 4004 may be possibly allocated in the second frame format, and determines that the processing results in a synchronized state, the receiving unit 204 of the terminal device 2A can recognize that the frame format of the signal received by the apparatus itself is the second frame format. In other words, the terminal apparatus 2A can detect the frame format in blind detection, and according to the above-described method, the terminal apparatus 2A can detect the frame format in blind detection through the synchronization processing.

The frame constituting unit 1033 can further include a broadcast signal resource 4007 to the second frame format. Like the first frame format, the frame constituting unit 1033 does not need to include the broadcast signal resource 4007 in all the transmit signals. The frame constituting unit 1033 can use a common resource to the resource on which the broadcast signal resource 4007 is allocated in the first frame format by the frame constituting unit 1033 or use different resources, as the resource for allocating the broadcast signal resource 4007 in the second frame format.

The resource on which the synchronization signal resource 4004 and the broadcast signal resource 4007 are allocated (or candidates of resource on which such resources are possibly allocated) can be determined in advance between the base station apparatus 1A and the terminal apparatus 2A for each frame format. In this case, the base station apparatus 1A can notify the terminal apparatus 2A of the frame format of the signal transmitted by the base station apparatus 1A itself, thereby notifying the terminal apparatus 2A of the resource or a resource candidate group.

The base station apparatus 1A can use the same information or use different information, as the information included in the signal transmitted on the broadcast signal resource 4007 allocated in the first frame format and the information included in the signal transmitted on the broadcast signal resource 4007 allocated in the second frame format. The base station apparatus 1A can use the same parameter or use different parameters, as a radio parameter (coding rate, modulation scheme, code length, spreading factor, or the like) of the signal transmitted on the broadcast signal resource 4007 allocated in the first frame format and a radio parameter of the signal transmitted on the broadcast signal resource 4007 allocated in the second frame format.

The base station apparatus 1A can notify the terminal apparatus 2A of the resource on which the broadcast signal resource 4007 is allocated in the second frame format by the frame constituting unit 1033 (or candidates of resource on which such resource is possibly allocated). The base station apparatus 1A can individually notify terminal apparatus 2A of the resource on which the broadcast signal resource 4007 is allocated in the first frame format and the resource on which the broadcast signal resource 4007 is allocated in the second frame format.

Note that it is needless to say that the information regarding each resource notified by the base station apparatus 1A to the terminal apparatus 2A can be determined in advance between the base station apparatus 1A and the terminal apparatus 2A.

The terminal apparatus 2A connected to the base station apparatus 1A can obtain the information included in the signal transmitted on the broadcast signal resource 4007, and thus recognize the frame format of the signal received by the terminal apparatus itself. In a case that the frame constituting unit 1033 of the base station apparatus 1A changes the resource for allocating the broadcast signal resource 4007 according to the frame format, the receiver 204 of the terminal apparatus 2A can perform demodulation processing of the broadcast signal on the resource on which the broadcast signal resource 4007 may be possibly allocated. The terminal apparatus 2A can recognize the frame format of the signal received by the terminal apparatus 2A itself based on information indicating the resource to which the notification signal correctively demodulated is mapped. In other words, the terminal apparatus 2A can detect the frame format in blind detection, and according to the above-described method, the terminal apparatus 2A can detect the frame format in blind detection through acquisition of the broadcast signal.

Like the first frame format, the frame constituting unit 1033 can use the frame format illustrated in FIG. 6 as the second subframe format (second subframe) and aggregate the subframes in the time direction and the frequency direction, to define the second frame format. In a case of aggregating the subframes, the frame constituting unit 1033 can aggregate the frames including all of the common RS resource 4001, the control signal resource 4000, the data signal resource 4001, and the specific RS resource 4003, and aggregate the frames including a specific combination of the four resources described above. For example, in a case of aggregating the subframes, the frame constituting unit 1033 can aggregate only multiple data signal resources 4001.

Figure 7:
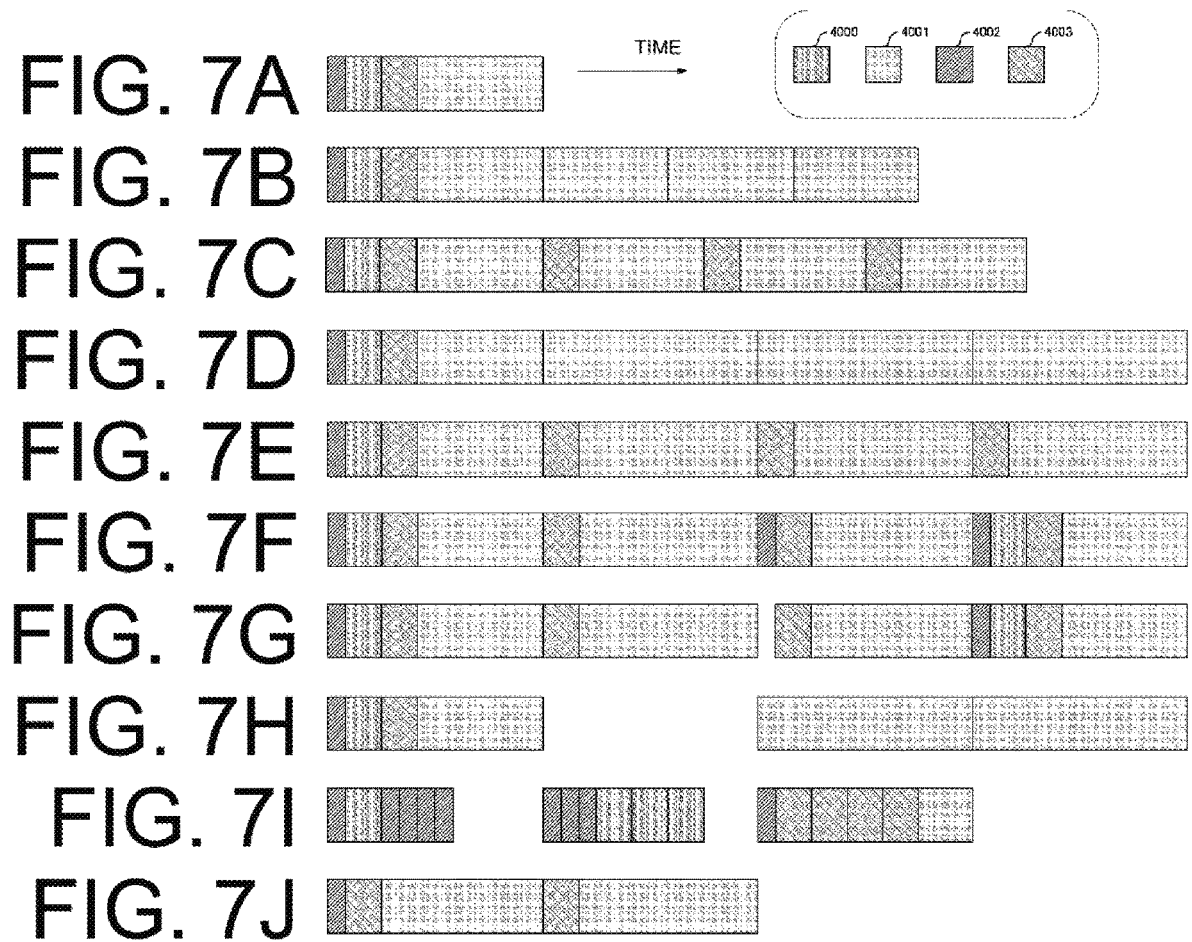
FIGS. 7A to 7J are diagrams illustrating examples of the frame format according to an aspect of the present embodiment.

FIGS. 7A to 7J are schematic diagrams illustrating examples of the frame format (second frame format) of the downlink signal generated by the frame constituting unit 1033 according to the present embodiment. FIG. 7A illustrates a case in which no aggregation is performed. As illustrated in FIG. 7B, the frame constituting unit 1033 can aggregate the data signal resources 4001 in the time direction. According to the example illustrated in FIG. 7B, the base station apparatus 1A can flexibly change the frame format depending on the data size (payload size) of data addressed to the terminal apparatus 2A.

As illustrated in FIG. 7C, the frame constituting unit 1033 can aggregate the specific RS resources 4003 in addition to the data signal resources 4001 in the time direction. According to FIG. 7C, the base station apparatus 1A can allocate the data signals addressed to different terminal apparatuses 2 on the data signal resources 4001. The specific RSs are periodically allocated in the time direction, and thus the base station apparatus 1A can provide stable radio communication to the terminal apparatus 2 in environment of the high-speed movement.

As illustrated in FIG. 7D, the frame constituting unit 1033 can aggregate the data signal resources 4001 in the time direction, and in this case, the frame length of the data signal resources 4001 to be aggregated can be made identical to the frame length of a frame in non-aggregation (frame length of the frame illustrated in FIG. 7A). According to 7D, even in a case that neighboring base station apparatuses transmit a downlink signal based on the second frame format with different aggregation sizes, the base station apparatuses can easily take frame synchronization. Of course, as illustrated in FIG. 7E, also in a case that the specific RS resources 4003 are aggregated in addition to the data signal resources 4001 in the time direction, the frame lengths of the frames for aggregation can be made identical.

As illustrated in 7F, the frame constituting unit 1033 can further aggregate the common RS resources 4002 and the control signal resources 4000 in the time direction. As illustrated in FIG. 7G and FIG. 7H, the frame constituting unit 1033 can include non-transmit period (null period, NULL period) of the base station apparatus 1A in the frame format. The length of the non-transmit period may be equal to the length of the data signal resource 4001, and may be an integer multiple of the elements constituting the data signal resource 4001 (e.g., OFDM signal length).

As illustrated in FIG. 7I, the frame constituting unit 1033 can aggregate the control signal resources 4000, the common RS resources 4002, and the specific RS resources 4003. Aggregating the common RS resources 4002 by the frame constituting unit 1033 enables the transmitter 103 to apply different beam forming to the common RSs transmitted with the common RS resources. Therefore, for example, the terminal apparatus 2A can notify the connected base station apparatus 1A of the reception quality associated with the multiple common RSs.

As illustrated in FIG. 7J, the frame constituting unit 1033 can use the second frame format including no control signal resources 4000, and can use the second frame format including no control signal resources 4000 and no common RS resources 4002.

As illustrated in FIG. 7J, in a case that the base station apparatus 1A transmits a signal, based on the second frame format including no control signal resources 4000 and no common RS resources 4002, the base station apparatus 1A can transmit the second frame format including the control signal resource 4000 and the common RS resource 4002 in another frequency. For example, the base station apparatus 1A can transmit the signal based on the second frame format including no control signal resources 4000 and no common RS resources 4002 for a signal transmitted in a higher frequency band that is equal to or higher than 6 GHz, while transmitting the signal based on the second frame format including the control signal resource 4000 and the common RS resource 4002 for a signal transmitted in a lower frequency band that is lower than 6 GHz. In this case, the base station apparatus 1A can transmit the signal based on the second frame format including no specific RS resources 4003 and no data signal resources 4001 in a case of transmitting the signal in the lower frequency band that is lower than 6 GHz.

Note that in a case that the frame constituting unit 1033 aggregates the signals generated based on the second frame format in the time direction and the frequency direction, the number of resources (e.g., common RS resources 4002 or data signal resources 4001) included in each signal to be aggregated may be in common for respective signals and may be a different value for the respective signals. From the viewpoint of suppressing an overhead relating to signalling from the base station apparatus 1A to the terminal apparatus 2A, it is preferable that the number of resources is associated with the signal length and the frequency bandwidth of the signal to be aggregated. The frame lengths and the frequency bandwidths of multiple frames to be aggregated may be in common or may be different from each other. From the viewpoint of suppressing the overhead relating to signalling from the base station apparatus 1A to the terminal apparatus 2A, it is preferable that the relationship of the frame length and the frequency bandwidth between the frames corresponds to an integer multiple relationship.

Figure 8:
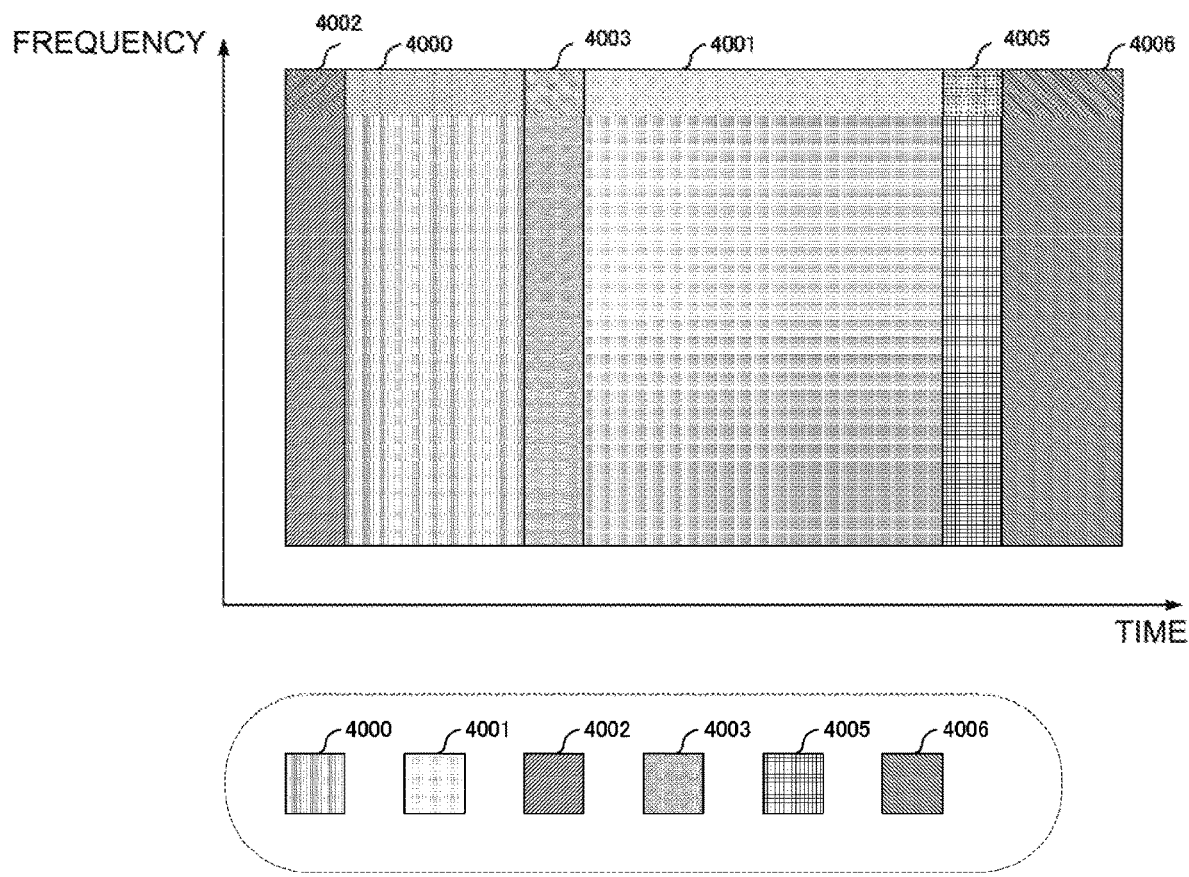
FIG. 8 is a diagram illustrating an example of the frame format according to an aspect of the present embodiment.

FIG. 8 is a schematic diagram illustrating a configuration example of the frame format according to the present embodiment. The frame constituting unit 1033 can include an RF switch period 4005 and an uplink signal resource 4006 to the second frame format as illustrated in FIG. 8. The frame format illustrated in FIG. 8 can be used by the base station apparatus 1A and the terminal apparatus 2A that adopt Time division duplex (TDD) as a duplex scheme. The RF switch period 4005 is a period during which the terminal apparatus that has received the signal transmitted by the base station apparatus 1A based on the frame format switches a receiving operation of the terminal apparatus itself to a transmitting operation. The base station apparatus 1A may configure the RF switch period 4005 to be a non-transmit period or may transmit any signal (e.g., common RS) in the RF switch period 4005. Note that, to continuously transmit the frames generated based on the second frame format, the frame constituting unit 1033 may also provide the RF switch period 4005 in the latter half of the uplink signal resource 4006, and may configure a non-transmit period between the frames continuously transmitted. Note that, in a case that the base station apparatus 1A uses the second frame format, the base station apparatus 1A can configure the RF switch period 4005 and the uplink signal resource 4006 to the second frame format for TDD, and generate the transmit signal based on the second frame format for FDD, without configuring the RF switch period 4005 and the uplink signal resource 4006 to the second frame format.

The terminal apparatus 2A that has received the transmit signal transmitted by the base station apparatus 1A based on the frame format illustrated in FIG. 8 can allocate, to the uplink signal resource 4006, information (ACK or NACK) indicating whether the data signal addressed to the terminal apparatus itself allocated in the data signal resource 4001 is successfully received, and transmit the uplink signal resource 4006 to the base station apparatus LA. Therefore, the base station apparatus 1A can recognize immediately whether the data signal addressed to the terminal apparatus 2A is correctly received, and thus it is possible to shorten a delay time relating to the transmission of the downlink signal.

The frame constituting unit 1033 can define multiple frame formats including the first frame format and the second frame format. The frame constituting unit 1033 can define multiple frame formats by changing radio parameters of the first frame format and the second frame format. Here, the radio parameters include some or all of a frequency bandwidth, a center frequency, a frequency band, a subcarrier interval, the number of subcarriers, a symbol length, a FFT/IFFT sampling period, a GI length, a CP length, a frame length, a subframe length, a slot length, a TTI, the number of FFT points, a kind of applied error correcting coding (e.g., a turbo code is applied to the first frame format, and a low density parity check code is applied to the second frame format). In a case that different radio parameters are configured in the same frame format, such configurations are referred to as different types (modes). For example, in a case that radio parameter 1 and radio parameter 2, values of which are different from each other, are configured for the first frame format, one can be referred to as first frame format type 1 and the other can be referred to as first frame format type 2. The base station apparatus can include a radio parameter set in which each value included in the radio parameters is configured in advance. One or multiple radio parameter sets can be configured, and the frame constituting unit 1033 can change the radio parameter set to configure the different frame formats/frame format types. In a case that the multiple radio parameter sets are provided, each radio parameter set can be configured with a simple rule. For example, in a case that three radio parameter sets are provided, the subcarrier interval of radio parameter set 2 may be X times (X is an integer of 2 or more) the subcarrier interval of radio parameter set 1, and the subcarrier interval of radio parameter set 3 may be Y times (Y is an integer of 2 or more) the subcarrier interval of radio parameter set 2. Note that some of the parameters included in the radio parameter sets may be a common value. The radio parameter set is transmitted (indicated) from the base station apparatus to the terminal apparatus. At this time, the terminal apparatus can detect the frame format/frame type from the radio parameter set received from the base station apparatus. Note that, in the following, unless otherwise specified, it is assumed that the frame format includes the frame format type, whether the radio parameter set is supported may depend on terminal capability.

The base station apparatus 1A according to the present embodiment can selectively or simultaneously use the multiple frame formats. The base station apparatus 1A can selectively configure different radio parameters or configure some of the radio parameters to be in common, for the first frame format and the second frame format. The base station apparatus 1A can notify the terminal apparatus 2A of information indicating the frame format used for the transmit signal in the base station apparatus itself. Here, the information indicating the frame format includes information (a numerical value, an index, an indicator) indicating any of multiple frame formats defined in advance by the base station apparatus 1A, information indicating the resources and the like included in the frame format (e.g., information indicating that any of the control signal resource 4000, the data signal resource 4001, the common RS resource 4002, and the specific RS resource 4003 is included, or any of such resources are not included), information indicating the resources on which such resources and the like are allocated and resource candidates on which such resources and the like are possibly allocated, and the like. The base station apparatus 1A can notify the terminal apparatus 2A of at least a part of information indicating the frame format by using signalling in a PRY layer, and can notify the information by using higher layer signalling such as RRC signalling.

The base station apparatus 1A can switch between the frame formats to use depending on use cases (or use scenarios) for providing services by the apparatus itself. The base station apparatus 1A can change the radio parameters of the frame format to use depending on the use scenarios for providing services by the apparatus itself.

The base station apparatus 1A according to the present embodiment may include a combination (set) of multiple frame formats or a combination (set) of multiple radio parameters configured in the frame format sets, to satisfy multiple use scenarios. The base station apparatus 1A can select a frame format, according to the use case for providing communication services by the apparatus itself from the frame format set (or the combination of the radio parameter sets) prepared in advance, and generate the transmit signal to be transmitted from the apparatus itself. The frame format sets included in the base station apparatus 1A may be in common to the frame format sets included in other base station apparatuses, or may be different from the frame format sets included in other base station apparatuses. The base station apparatus 1A can notify the terminal apparatus 2A connected to the base station apparatus itself of the frame format sets included in the base station apparatus itself.

The base station apparatus 1A according to the present embodiment can switch between multiple transmission modes to select any of the transmission mode, to satisfy the multiple use scenarios. Here, the transmission modes are defined by combinations of a radio parameter, a multiplexing scheme, a scheduling method, a precoding method, and the like, that can be used by the transmitter 103 of the base station apparatus 1A in a case of generating the transmit signal. The frame format can be allocated to each of the multiple transmission modes. Note that the frame formats/radio parameters allocated to the multiple transmission mode may be different from each other, and may be partly in common. In this case, the base station apparatus 1A can select a transmission mode, and thus selectively use the multiple frame formats/radio parameters.

The base station apparatus 1A can selectively or simultaneously use the multiple frame format for each of Enhanced mobile broadband (EMBB), Enhanced Massive machine type communication (EMTC), and Ultra-reliable and low latency communication (URLLC), as three use scenarios. The base station apparatus 1A can use the second frame format with different radio parameters for each of the EMBB, the EMTC, and the URLLC. The frame constituting unit 1033 can select the frame format and determine the radio parameters to be configured in the frame format in accordance with the use scenario for providing the communication services by the base station apparatus 1A.

For example, the base station apparatus 1A can generate a frame, based on the first frame format for the downlink signal relating to the EMBB, and generate a frame, based on the second frame format for the downlink signal relating to the MMTC and the URLLC. In this method, the base station apparatus 1A switches between the frame formats depending on the use cases (or the use scenarios) for providing services by the apparatus itself, but the method according to the present embodiment is not necessarily limited to the case in which the frame format is defined for each use case.

The base station apparatus 1A can selectively or simultaneously use the multiple frame formats/radio parameters, based on a radio medium for transmitting the downlink signal by the apparatus itself. Here, the radio medium can include radio resources such as a time resource and a frequency resource. The radio medium can include radio resources distinguished by a duplex scheme applied to a frequency band in which the base station apparatus 1A transmits the downlink signal.

The radio medium can include radio resources distinguished according to the use case (or use scenario) for providing the communication service by the base station apparatus 1A. The base station apparatus 1A can select the radio medium to be used according to the use case (or use scenario) for providing the communication service. The base station apparatus 1A can determine in advance the radio medium to be used in a case of providing the communication service in the use case (or use scenario). Therefore, the radio medium and the use case are associated with each other, and the base station apparatus 1A can selectively or simultaneously use multiple frame formats/radio parameters, based on which use case (or use scenario) the radio medium to be used is associated with.

The base station apparatus 1A can notify the terminal apparatus 2A of information indicating multiple frame formats/radio parameters selectively or simultaneously used, based on the radio medium for transmitting the downlink signal by the apparatus itself, by using PHY layer/MAC layer signalling or higher layer signalling such as RRC signalling. Note that the base station apparatus 1A does not need to notify the terminal apparatus 2A of all information indicating the multiple frame formats/radio parameters described above, and for example, the base station apparatus 1A can notify the terminal apparatus 2A of candidates of the multiple frame formats/radio parameters described above. The terminal device 2A can receive information indicating multiple frame formats/radio parameters selectively or simultaneously used by the base station apparatus 1A, based on the radio medium, through signalling in the above-described method from the base station apparatus 1A, and can detect a part of information in blind detection. The terminal apparatus 2A can notify the base station apparatus 1A of information of the multiple frame formats/radio parameters that can be received by the apparatus itself.

The base station apparatus 1A can selectively or simultaneously use the multiple frame formats/radio parameters, according to a frequency (frequency band, channel) for transmitting the downlink signal. For example, the base station apparatus 1A can divide frequencies at which the downlink signal can be transmitted into multiple groups. For example, the base station apparatus 1A can assume that frequencies below 6 GHz (Below 6 GHz) as frequency band 1 and frequencies equal to or above 6 GHz (Above 6 GHz) as frequency band 2, and switch the frame formats to use between a case of transmitting the downlink signal in frequency band 1 and a case of transmitting the downlink signal in frequency band 2. Moreover, the base station apparatus 1A can assume that frequencies below 2 GHz as frequency band 1, frequencies equal to or above 2 GHz and below 6 GHz as frequency band 2, and frequencies equal to or above 6 GHz as frequency band 3, and generate the transmit signal, based on the frame format defined in each frequency band in a case of transmitting the downlink signal in each frequency band.

Figure 9:
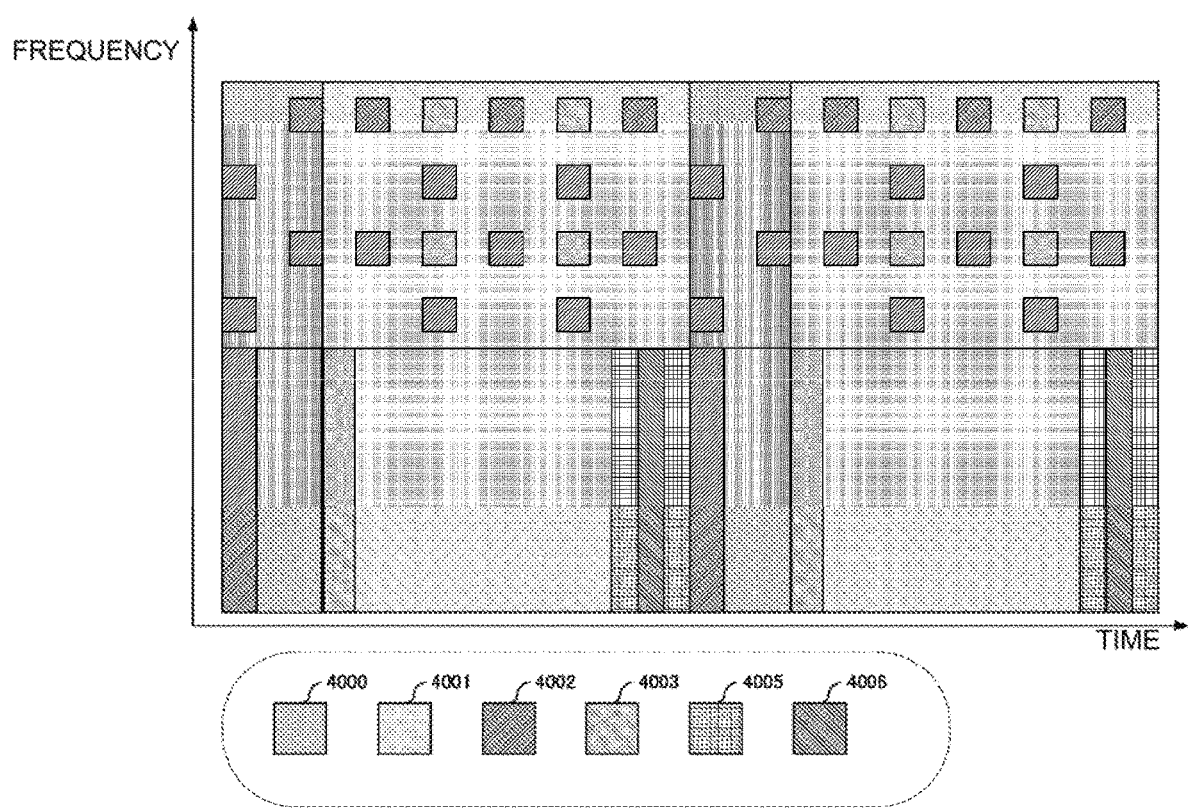
FIG. 9 is a diagram illustrating an example of the frame format according to an aspect of the present embodiment.

The base station apparatus 1A can simultaneously transmit signals generated based on different frame formats/radio parameters. FIG. 9 is a schematic diagram illustrating a configuration example of the downlink signal transmitted by the base station apparatus 1A according to the present embodiment. According to the example of FIG. 9, the base station apparatus 1A uses different frame formats depending on frequencies. The base station apparatus 1A can form an OFDM signal with multiple coexisting different frame formats. For example, multiple subcarriers constituting one OFDM signal are divided into multiple subcarrier groups, and transmit signals allocated in each of the subcarrier groups are generated based on different frame formats. Note that, according to the example of FIG. 9, the second frame format includes the RF switch period 4005 and the uplink signal resource 4006. Therefore, the base station apparatus 1A can generate a signal based on the first frame format and a signal based on the second frame format by using different OFDM signals, and can frequency-multiplexes the different OFDM signals and simultaneously transmit the multiplexed signal.

Note that, according to the example of FIG. 9, the subcarrier group generated based on the first frame format neighbors the subcarrier group generated based on the second frame format; however, the frame constituting unit 1033 can allocate a guard band (a null subcarrier, a non-transmit frequency) between the subcarrier groups. Further, according to the example of FIG. 9, the frame lengths of the signals transmitted by the subcarrier group generated based on the first frame format and by the subcarrier group generated based on the second frame format are equal; however, the frame lengths of the respective signals may be different. Note that, from the view point of synchronization in a radio network, it is preferred that the frame lengths of the signals transmitted by the respective subcarrier groups have a relationship of integer multiples.

Further, the transmitter 103 of the base station apparatus 1A can generate a filtered OFDM signal that applies a filter to each subcarrier, or to each subcarrier group consisting of multiple subcarriers. The filtered OFDM can be, for example, a Filter bank multicarrier, or Filtered OFDM. With the filtered OFDM, interference between the subcarriers (or between the subcarrier groups) is significantly reduced. The base station apparatus 1A can allocate a different frame format to each of the multiple subcarrier groups generated by the apparatus itself. For example, the transmitter 103 of the base station apparatus 1A can generate a first subcarrier group based on the first frame format, can generate a second subcarrier group based on the second frame format, and can generate a Filtered OFDM signal including the first subcarrier group and the second subcarrier group.

The base station apparatus 1A can define a frame format for each duplex scheme. For example, the base station apparatus 1A can define different frame formats for a case of FDD and a case of TDD. The base station apparatus 1A can generate transmit signals based on the first frame format in the case of FDD, while the base station apparatus 1A can generate transmit signals based on the second frame format in the case of TDD.

The base station apparatus 1A can selectively use multiple frame formats in one duplex scheme. For example, in the case that FDD is used as a duplex scheme, the base station apparatus 1A can selectively or simultaneously use the first frame format and the second frame format. The base station apparatus 1A can selectively or simultaneously use multiple radio parameters for the first frame format (or the second frame format) in one duplex scheme.

The base station apparatus 1A can use a duplex scheme in which FDD and TDD coexist, and the base station apparatus 1A can define a frame format for the duplex scheme in which FDD and TDD coexist. The base station apparatus 1A can selectively or simultaneously use multiple frame formats or radio parameters in the duplex scheme in which FDD and TDD coexist. As the duplex scheme in which FDD and TDD coexist, the base station apparatus 1A can use a duplex scheme in which FDD and TDD are temporally switched in a frequency band. As the duplex scheme in which MD and TDD coexist, the base station apparatus 1A can use Full duplex (or Simultaneous transmission and reception (STR)) in which uplink transmission and downlink transmission are simultaneously performed. In the STR, the base station apparatus 1A and the terminal apparatus 2A can simultaneously transmit the transmit signals generated based on different frame formats.

Concerning radio parameters configured in the first frame format and the second frame format, the base station apparatus 1A can configure different radio parameters between a case that the frequency band in which transmit signals generated based on each of the frame formats are transmitted is a frequency band of what is called a licensed band whose use is allowed (permitted) by a country or a region where a radio operator provides its service and a case that the frequency band is a frequency band of what is called an unlicensed band whose use need not be allowed by a country or a region.

Concerning radio parameters configured in the first frame format and the second frame format, in a case that the frequency band in which the transmit signals generated based on each of the frame formats are transmitted is an unlicensed band, the base station apparatus 1A can change radio parameters to be configured depending on the frequency band of the unlicensed band. For example, the base station apparatus 1A can change radio parameters between a case that the unlicensed band in which transmit signals are transmitted is a 5 GHz band and a case that the unlicensed band is a 60 GHz band.

The base station apparatus 1A can use, in the unlicensed band of a 60 GHz band, a frame format that can be obtained by multiplying an occupied frequency bandwidth of a frame format used in the unlicensed band of a 5 GHz band by an integer to expand the occupied frequency bandwidth. Further, the base station apparatus 1A can gather multiple transmit signals generated based on a frame format used in a licensed band of 6 GHz or more in the frequency direction, and can use the gathered transmit signals in the unlicensed band of a 60 GHz band. The base station apparatus 1A can allocate multiple component carriers generated based on a frame format used in the licensed band of 6 GHz or more in the unlicensed band of a 60 GHz band, and can simultaneously transmit the multiple component carriers to the terminal apparatus 2A by means of Carrier Aggregation (CA) and Dual Connectivity (DC) only by the apparatus itself or in cooperation with another base station apparatus.

In the unlicensed band of a 60 GHz band, the base station apparatus 1A can use a frame format of a bandwidth that is the same as the bandwidth 2 GHz and 2.16 GHz) of a channel defined in IEEE802.11ad, or a bandwidth that is an integer multiple of such bandwidth. The base station apparatus 1A can use a frame format in which an integer multiple of a frequency bandwidth (including the frequency bandwidth itself) corresponds to a bandwidth of a channel defined in IEEE802.11ad in the unlicensed band of a 60 GHz band and the licensed band of 6 GHz or more.

Concerning radio parameters configured in the first frame format and the second frame format, the base station apparatus 1A can configure different radio parameters between a case that the frequency band in which the transmit signals generated based on each of the frame formats are transmitted is an occupied frequency band that can be occupied and used by one radio operator and a case that the frequency band is a shared frequency band (Shared band) that is shared and used by multiple radio operators.

The base station apparatus 1A can allocate multiple transmit signals generated based on different frame formats in the frequency direction. In a case that the base station apparatus 1A allocates multiple transmit signals generated based on different frame formats in the frequency direction, the base station apparatus 1A can simultaneously transmit the multiple transmit signals by means of carrier aggregation (CA) that performs transmission by aggregating multiple component carriers (CC). Note that the multiple CCs transmitted by carrier aggregation can be transmitted by different multiple base station apparatus. Further, in carrier aggregation, one Primary Cell (PCell) and one or multiple Secondary Cells (SCells) are configured as a set of serving cells.

The base station apparatus 1A can use different frame formats/radio parameters for multiple CCs transmitted by CA. For example, in a case that the base station apparatus 1A performs transmission of 2CCs in CA, the base station apparatus 1A can apply the first frame format to the first CC, and can apply the second frame format to the second CC. The base station apparatus 1A can generate a transmit signal transmitted by each CC, based on the second frame format in which different radio parameters are configured. Specifically, the base station apparatus 1A can configure a frame format/radio parameter for each cell. For example, the base station apparatus 1A can perform communication using the first frame format in a PCell/SCell(s), and can perform communication using the second frame format in a SCell(s). Although the base station apparatus 1A performs communication using the second frame format in a PCell and a SCell(s), configured radio parameters can be different in each cell.

The base station apparatus 1A can contain information indicating a frame format to be configured in a CC to be a Secondary Cell in control information to be allocated to the control signal resource 4000 contained in a CC to be a Primary Cell.

In a case that the base station apparatus 1A allocates multiple transmit signals generated based on different frame formats in the frequency direction, the base station apparatus 1A can transmit the multiple transmit signals from multiple transmit points in cooperation with another base station apparatus in Dual connectivity (DC) that simultaneously transmits signals. In DC, a Master Cell Group (MCG) and a Secondary Cell Group (SCG) are configured as groups of serving cells. The MCG is constituted by a PCell, optionally, with one or multiple SCells. The SCG consists of a Primary SCell (PSCell), optionally, with one or multiple SCells. For example, in a case that the base station apparatus 1A and the base station apparatus 1B transmit a downlink signal to the terminal apparatus 2A by means of DC, each of the base station apparatus 1A and the base station apparatus 1B can generate the transmit signals, based on different frame formats/radio parameters, and can transmit the transmit signals. Further, in the case that the base station apparatus 1A and the base station apparatus 1B transmit the downlink signal to the terminal apparatus 2A by means of DC, each of the base station apparatus 1A and the base station apparatus 1B can generate the transmit signals based on the second frame format in which different radio parameters are configured, and can transmit the transmit signals. In other words, the base station apparatus 1A can configure the frame format/radio parameter for each cell. For example, different frame formats are configured between a PCell and a PSCell, and different frame formats are configured between a PCell/PSCell and a SCell(s). Further, the base station apparatus 1A/1B can configure the second frame format in which different radio parameters are configured in the PCell and the PSCell.

The base station apparatus 1A can notify the terminal apparatus 2A of information regarding each frame format/radio parameter configured to multiple downlink signals allocated in the frequency direction. In a case of CA or DC, the base station apparatus 1A can transmit information regarding the frame format/radio parameter configured in each cell to the terminal apparatus 2A.

The base station apparatus 1A can allocate multiple transmit signals generated based on different frame formats/radio parameters in a spatial direction. For example, in a case that the base station apparatus 1A simultaneously transmits downlink signals to the terminal apparatus 2A and the terminal apparatus 2B by means of multi-user multiple input multiple output (MU-MIMO), the base station apparatus 1A can generate a transmit signal to be transmitted to the terminal apparatus 2A and a transmit signal to be transmitted to the terminal apparatus 2B based on different frame formats, and can perform spatial multiplexing on the two transmit signals to transmit the multiplexed signals.

Specifically, the transmit signals transmitted by the base station apparatus 1A according to the present embodiment can include the transmit signals that are generated based on different frame formats in the spatial direction and multiplexed in spatial multiplexing.

In the case that the base station apparatus 1A multiplexes the transmit signals generated based on different frame formats in the spatial direction, the base station apparatus 1A can make at least some of resources to which the specific RS resources 4003 are allocated be in common for each frame format.

Further, in a case that the terminal apparatus 2A includes a function of removing or reducing inter-user interference or inter-neighboring cell interference, the base station apparatus 1A can transmit assist information for removing or reducing the inter-user interference or the inter-neighboring cell interference. The assist information (neighboring cell information) includes a part of all of a physical cell ID, the number of CRS ports, a PA list, PB, Multimedia Broadcast multicast service Single Frequency Network (MBSFN) subframe configuration, a transmit mode list, resource allocation granularity, UL/DL subframe structure of TDD, ZP/NZP CSI-RS configuration, quasi co-location (QCL) information, a frame format, and a radio parameter. Note that PA represents a power ratio (power offset) between the PDSCH and the CRS in OFDM symbols to which any CRS is not allocated. PB represents a power ratio (power offset) between the PDSCH in OFDM symbols to which the CRS is allocated and the PDSCH in OFDM symbols to which any CRS is not allocated. The QCL information is information regarding QCL for a prescribed antenna port, a prescribed signal, or a prescribed channel. In a case that, concerning two antenna ports, long-distance characteristics of a channel through which symbols of one antenna port are carried can be estimated based on a channel through which symbols of another antenna port are carried, those antenna ports are said to be QCL. The long-distance characteristics include delay spread, Doppler spread, Doppler shift, and average gain and/or average delay. Specifically, in a case that two antenna ports are the terminal apparatus can consider that the long-distance characteristics of those antenna ports are the same. Note that one value (candidate) may be configured or multiple values (candidates) may be configured in each parameter included in the assist information. In a case that multiple values are configured, the terminal apparatus interprets that a value that may be configured by a base station apparatus to interfere is indicated in the parameter, and detects (identifies) the parameter configured in an interference signal out of the multiple values. The assist information may indicate information of another base station apparatus/beam, and may indicate information of the base station apparatus/beam itself. The assist information may be used in various measurements. The measurements include Radio Resource Management (RRM) measurement, Radio Link Monitoring (RLM) measurement, and Channel State Information (CSI) measurement.

The terminal apparatus 2 can connect one of component carriers for communicating with the base station apparatus 1 as a Primary cell (PCell), and a used frequency band is a licensed band (first frequency bandwidth). Here, the licensed band refers to a frequency band whose use is allowed by a country or a region where a radio operator provides its service. Specifically, the licensed band is a frequency band that can be used by a specific radio operator in a dedicated manner.

The base station apparatus 1 according to the present embodiment can communicate data with the terminal apparatus 2 by means of CA that uses a part of an unlicensed band as a Secondary cell (Scell). Consequently, the terminal apparatus 2 can conduct monitoring of the Physical Downlink Control Channel (PDCCH) and the Enhanced Physical Downlink Control Channel (EPDCCH) on which the base station apparatus 1 transmits control information of downlink data transmission by using the unlicensed band as well as using the licensed band. The monitoring of the PDCCH includes synchronization processing, and blind decoding of search space to decode Downlink control information (DCI). Here, the unlicensed band (second frequency bandwidth) refers to a frequency band whose use need not be allowed by a country or a region and a radio operator can provide its service. Specifically, the unlicensed band is a frequency band that cannot be exclusively used by a specific radio operator. Note that a communication method according to the present embodiment can be applied not only to transmission (downlink transmission, downlink channel, downlink) from the base station apparatus 1 to the terminal apparatus 2, hut also to transmission (uplink channel, uplink) from the terminal apparatus 2 to the base station apparatus 1.

Note that the frequency band in which the base station apparatus 1 according to the present embodiment performs communication is not limited to the licensed band or the unlicensed band described in the above. The frequency bands considered in the present embodiment include a frequency band of what is called a white band (white space), which is actually unused for the purpose of preventing crosstalk between frequencies or the like although a country or a region allows use of specific service, (e.g., a frequency band that is allocated for television broadcasting but is unused depending on areas), and a shared frequency band that has been exclusively allocated to a specific radio operator but is anticipated to be shared by multiple radio operators in the future. For example, the present embodiment includes a case in which the base station apparatus 1 configures the Pcell to the licensed band while configuring the Scell as a part of the whiteband. The frame constituting unit 1033 may change the frame structure of the Scell signal in accordance with the frequency band where the Scell is configured by the base station apparatus 1.

The receiver 104 of the base station apparatus 1 and the receiver 204 of the terminal apparatus 2 according to the present embodiment include a function of performing carrier sense. The carrier sense is a function of determining whether a radio medium is in an available mode (an idle mode) or in an occupied mode (a busy mode). For example, in a case that received power of a signal received by the antenna 105 exceeds a prescribed threshold (a carrier sense level, a CCA level, an energy detection level), the receiver 104 of the base station apparatus 1 determines that the radio medium is in a busy mode (an occupied mode), and the transmitter 103 stops transmission of the transmit signals. In a case that received power of the signal received by the antenna 105 does not exceed the prescribed threshold, the receiver 104 of the base station apparatus 1 determines that the radio medium is in an idle mode (an available mode), and the transmitter 103 can start transmission of the transmit signals. The carrier sense operation according to the present embodiment at least includes a method (energy detection reference) of determining based on received power of the received signal as described above, and a method (preamble detection reference) of determining also based on information (e.g., information indicating a communication standard with which the signal is in conformity) included in the received signal in addition to the received power of the received signal.

Note that the carrier sense operation according to the present embodiment can include an operation relating to transmission standby. The operation relating to transmission standby includes operation of waiting for transmission only for a predetermined prescribed length (e.g., 34 us, 25 us, 16 us). The operation relating to transmission standby includes an operation of waiting for transmission only for a period of time determined based on a random value selected by each of the base station apparatus 1 and the terminal apparatus 2. The random value can be selected based on a value that is selected between a prescribed minimum value and a prescribed maximum value. The base station apparatus 1 and the terminal apparatus 2 can continue conducting carrier sense based on the energy detection reference and the preamble detection reference described above during the operation relating to the transmission standby.

The present embodiment assumes that the base station apparatus 1 performs Carrier aggregation (CA) to the terminal apparatus 2A and the terminal apparatus 2B by further using a part of an unlicensed band as a Secondary cell (Scell). However, in a case that a communication system continuously occupies an unlicensed band, based on the LTE scheme, other apparatus performing communication by means of other existing communication systems exemplified by the IEEE802.11 system fails to perform communication in the unlicensed band. The base station apparatus 1 fails to perform carrier sense by using the frequency band during the period of time in which the base station apparatus 1 performs communication by using a part of an unlicensed band as the Scell.

In view of this, the frame constituting unit 1033 of the base station apparatus 1 according to the present embodiment performs control such that signals transmitted in the Pcell and signals transmitted in the Scell based on the LTE scheme by the base station apparatus 1 have different frame structures.

Figure 12:
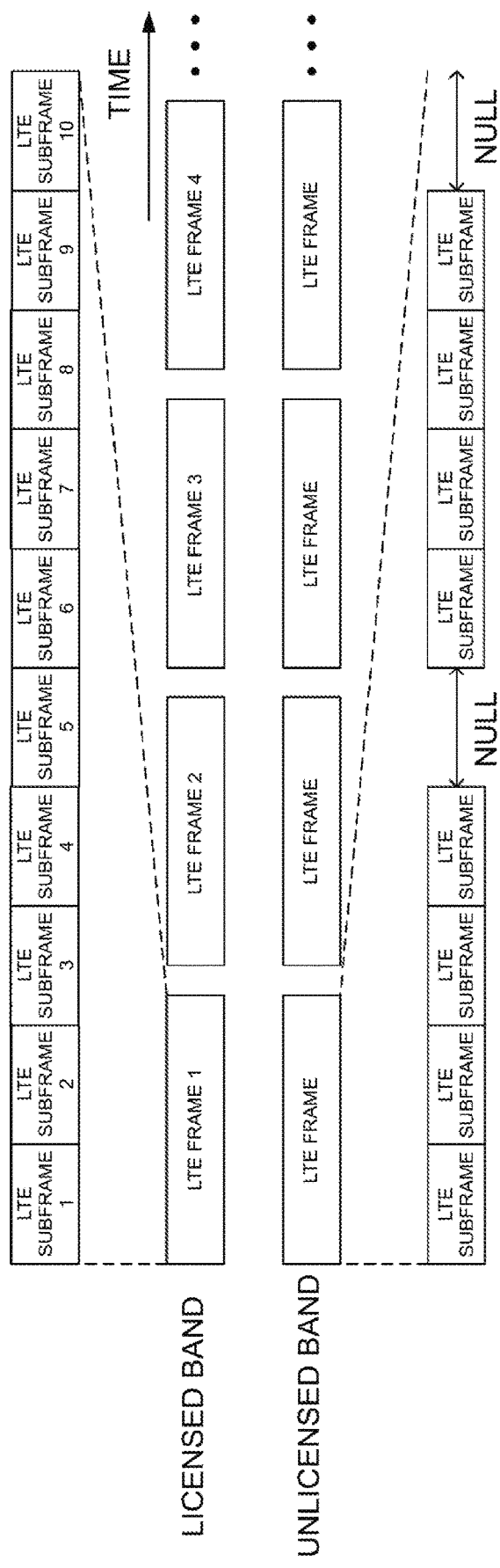
FIG. 12 is a diagram illustrating an example of the frame format according to an aspect of the present embodiment.

FIG. 12 is a diagram illustrating an example of a frame structure of the frame constituting unit 1033 according to the present embodiment. The frame based on the LTE scheme (LTE frame) includes 10 subframes (LTE subframe), each subframe being one millisecond (ms) in length. The frame is thus 10 ms long. In the present embodiment, the signal transmitted by the base station apparatus 1 via the Pcell in the licensed band may use the frame structure of the LTE scheme. The communication method of the signal transmitted by the base station apparatus 1 according to the present embodiment in the licensed band may be limited to any method. Of course, the communication method used by the base band apparatus 1 in the licensed band may be a communication method in which multiple frame structures are configurable as described above.

On the other hand, in the present embodiment, the frame structure of the signal to be transmitted by the base station apparatus 1 via the Scell in the unlicensed band is 10 ms in length like the LTE frame, while the number of the subframes constituting the frame is smaller than 10. In other words, the frame constituting unit 1033 provides a non-signal period (a period illustrated as Null in FIG. 12) including no signal, to the frame of the signal to be transmitted by the base station apparatus 1 via the Scell in the unlicensed band. The number of the subframes constituting the frame may be the number by using a decimal point, for example, "8.5 frames" instead of the natural number. A subframe with the small number of OFDM symbols may be used. The subframe with small number of OFDM symbols may be referred to as a partial subframe. The base station apparatus 1 can transmit, to the terminal apparatus 2, control information indicating whether the subframe is the partial subframe and/or the number of OFDM symbols including in the partial subframe. The frame constituting unit 1033 performs control so that the sum of the period of allocation of the LTE subframes and the non-signal period is equal to the frame length of the LTE frame to be transmitted by the base station apparatus 1 via the Pcell in the licensed band. In other words, the frame length of the signal for the Scell configured by the frame constituting unit 1033 is kept constant (for example, 10 ms), and the signal frame length does not depend on the number of the LTE subframes included in the frame of the single signal and the length or allocation position of the non-signal period. The frame structure thus configured by the frame constituting unit 1033 allows the respective apparatuses in the communication system including the base station apparatus 1 to perform carrier sense in the Null period. For example, other terminal apparatus 2 can start communication, based on the access scheme called Carrier sense multiple access with collision avoidance (CSMA/CA).

The frame constituting unit 1033 may perform control so that the signal frame to be transmitted via the Scell includes multiple signal frames and the null frames for implementing the method which gives the null period to the frame of the signal transmitted by the base station apparatus 1 via the Scell. In this case, the null frames refer to the frames containing no signal. The signal frame refers to the frame containing the signal (for example, LTE subframe). The null frame length is not limited to any length, and for example, the frame constituting unit 1033 can make the null frame length be the same as the LTE subframe length. The frame constituting unit 1033 configures the frame of the signal to be transmitted via the Scell so that the total period of the multiple LTE subframes and the null frames is equal to the length of LTE frame to be transmitted by the base station apparatus 1 via the Pcell in the licensed band. Note that the null period is not necessarily configured at the end of the LTE frame, but may be configured at the head of the LTE frame.

Note that the non-signal period in the present embodiment may include a case that each apparatus completely stops signal transmission in the radio resource, and a case that each apparatus transmits a signal to apparatuses except for the apparatus itself with transmit power or a channel structure such that the signal is received with the reception power equal to or lower than the prescribed power carrier sense level). For example, the base station apparatus 1 may perform control to transmit only the synchronization channel signal (e.g., PSS and SSS) in the non-signal period. The base station apparatus 1 may perform control so that only the system information of the apparatus itself (e.g., the broadcast information transmitted by the base station apparatus 1 on the Physical Broadcast Channel (PBCH), and the Beacon frame used for IEEE802.11 system) is transmitted in the non-signal period.

Note that the base station apparatus 1 may control so that, in the non-signal period, the synchronization channel signal such as PSS and SSS is not transmitted via the Scell in the unlicensed hand, while being transmitted via the Pcell in the licensed band.

Note that, in FIG. 12, the 1-ms null period is provided at every 4 subframes or 4 ms. However, the length of the null period, and the number of subframes to the null periods are not limited to the method as illustrated in FIG. 12. The length of the null period is preferably the integer multiple of the subframe length/OFDM symbol, but the length is not limited to this. The frame constituting unit 1033 may give the null periods to the frame of the signal via the Scell periodically, or adaptively give the null period, based on the traffic amount or the like of the communication system.

The higher layer processing unit 101 allows the frame structure of the signal transmitted via the Scell in the unlicensed band as configured by the frame constituting unit 1033 to be contained in the higher layer signal to the respective terminal apparatuses, for example, the Radio resource control (RRC) signal. The higher layer processing unit 101 may be operated to perform in advance signalling of the information indicating the multiple frame structures that are possibly configured by the frame constituting unit 1033 to the respective terminal apparatuses. Furthermore, the higher layer processing unit 101 may be operated to perform in advance signalling of the information indicating priority of the multiple frame structures configured by the frame constituting unit 1033 to the respective terminal apparatuses. The base station apparatus 1 may include the information indicating the frame structure actually used by the frame constituting unit 1033 among the multiple frame structures signaled to the respective terminal apparatuses by the higher layer processing unit 101, in other control information (e.g., the control information transmitted via the Pcell and Scell on the PDCCH and the EPDCCH). The control information may be information indicating the position of the null period given by the frame constituting unit 1033 to the frame of the signal transmitted via the Scell in the unlicensed band, or information indicating the position of the LTE subframe transmitted in the frame.

Note that the base station apparatus 1 may not explicitly notify the respective terminal apparatuses of the frame structure configured by the frame constituting unit 1033. For example, the terminal apparatuses 2A and 2B may recognize the information (e.g., cell ID and the like) indicating the base station apparatus 1 currently connected to the terminal apparatuses from other signal transmitted by the base station apparatus 1 (e.g., signal transmitted by PSS and SSS). In this case, the frame structure configured by the frame constituting unit 1033 is associated with the cell ID in advance, and thus the terminal apparatuses UE1 and UE2 can recognize the frame structure configured by the frame constituting unit 1033. The base station apparatus 1 allows preliminary signalling of the frame structure configured by the frame constituting unit 1033, and a table representing the relation with the cell ID to the respective terminal apparatuses.

The receiver 104 may perform carrier sense in the null period. Based on the result of carrier sense, the frame constituting unit 1033 can change the frame structure. For example, in a case that the unlicensed band fails to be secured though carrier sense, the frame constituting unit 1033 may configure the LTE subframe period allocated subsequent to the null period to the null period.

In a case that the frame constituting unit 1033 further adds the null to the frame of the signal via the Scell, based on the result of carrier sense, the base station apparatus 1 allows signalling of the frame structure configured by the frame constituting unit 1033 to the respective terminal apparatuses again by means of the higher layer signal and the control information transmitted through the PDCCH. In a case of signalling of the frame structure configured by the frame constituting unit 1033 by means of the control information transmitted by the base station apparatus 1 on the PDCCH, it is possible to perform signalling only of the information regarding the difference between the signaled frame structure and the frame structure which has been notified in advance to the respective terminal apparatuses by the higher layer signalling.

The frame constituting unit 1033 can allow application of the Almost blank subframe (ABS) standardized in LTE to give the null period to the frame of the signal transmitted via the Scell. The ABS is a technique in which the base station apparatus (or terminal apparatus) partially reduce transmit power of the physical channel (e.g., PDSCH, PDCCH) for a part of the subframe, or to stop transmission, to mainly suppress the inter-cell interference between neighboring cells. The frame constituting unit 1033 may provide, through use of the ABS, the null period by stopping transmission of a part of subframes in the frame of the signal transmitted via the Scell, or reducing the transmit power. The frame constituting unit 1033 may apply the ABS periodically (e.g., at every 4 ms) to the frame of the signal transmitted via the Scell to allocate periodic null periods.

Note that, in the present embodiment, the null period configured by the frame constituting unit 1033 is not necessarily intended to suppress the inter-cell interference between the neighboring cells. In a case that the communication system according to the present embodiment includes multiple base station apparatuses, and each of the base station apparatuses gives the null period to the frame of the signal transmitted via the Scell in the unlicensed band through use of the ABS, the timing for giving the null period to the frame of the signal is not needed to make different between the adjacent base station apparatuses. In order to suppress the influence of interfering and interfered relationship with other system represented by the IEEE802.11 system, it is preferable to align timing for giving the null period to the frame of the signal between the adjacent base station apparatuses.

Meanwhile, based on the information indicating the frame structure of the signal transmitted through signalling by the base station apparatus 1 via the Scell in the unlicensed band, the terminal apparatuses 2A and 2B perform the process for demodulating signal transmitted in the unlicensed band. At this time, the receiver 204 may stop monitoring the control information in the null period given to the frame of the signal transmitted via the Scell. In a case that the base station apparatus 1 transmits only the synchronization channel in the null period, the receiver 204 may perform only the synchronization process in the null period.

The frequency band where the CA is performed by the base station apparatus 1 according to the present embodiment is not limited to the licensed band and the unlicensed band as described above. The frequency band according to the present embodiment includes a frequency band, called a white band, and the shared frequency band. The white band has been licensed by the country or region for the specific services, but actually kept unused for preventing the inter-frequency interference (e.g., the frequency band which has been assigned for a TV broadcasting, but kept unused in a certain region). The shared frequency band has been assigned exclusive to the specific operator, but reconsidered for the shared utilization among the multiple operators in the future. For example, the present embodiment includes a case in which the base station apparatus 1 configures the Pcell to the licensed band while configuring the Scell as a part of the whiteband. The frame constituting unit 1033 can change the frame structure of a signal in a Scell depending on the frequency band in which the base station apparatus 1 configures the Scell.

The transmitter 203 of the terminal apparatus 2 according to the present embodiment can transmit a transmit signal (discrete spectrum signal) having the signal spectrum in which spectrum are arranged in non-contiguous manner to the base station apparatus 1 as an uplink signal. FIGS. 10A and 10B are schematic diagrams illustrating examples of the discrete spectrum signal generated by the transmitter 203 of the terminal apparatus 2 according to the present embodiment. FIG. 10A only illustrates the discrete spectrum signal of the terminal apparatus 2A. As FIG. 10A illustrates, the discrete spectrum signal of the terminal apparatus 2A includes parameters of at least a bandwidth 3A of a spectrum set, a frequency interval 3B between the spectrum sets, a subcarrier interval 3C, and the number of spectrum sets. The description will be made below on the assumption that the bandwidth 3A of the spectrum set and the frequency interval 3B between the spectrum sets are common to all the spectrum sets. The communication method according to the present embodiment, however, is not limited to the above-described conditions.

FIG. 10B illustrates the frequency multiplexed discrete spectrum signals of the two terminal apparatuses 2 (terminal apparatuses 2A and 2B). As illustrated in FIG. 10B, the base station apparatus 1 configures the scheduling information to the terminal apparatuses 2 so as to prevent an overlap between discrete spectrum signals 4A and 4B of the terminal apparatuses 2A and 2B, respectively. The terminal apparatuses 2A and 2B can transmit the uplink signals without being mutually interfered. The above case is effective only in the case of the same subcarrier intervals of the discrete spectrum signals transmitted by the terminal apparatuses 2A and 2B. The single terminal apparatus may transmit the frequency multiplexed discrete spectrum signals. In a case that the frequency interval between the spectrum sets takes a fixed value, the scheduling information may be located at the frequency position of the spectrum set as a reference. Note that, an allocated resource in the case that frequency interval between the spectrum sets is the fixed value may be referred to as an interlace, and the scheduling information may be referred to as interlace allocation information.

As described above, the terminal apparatus 2 according to the present embodiment may configure the multiple frame formats with different subcarrier intervals for the uplink signal. This means that the terminal apparatuses 2A and 2B can generate the discrete spectrum signals, based on the frame formats with different subcarrier intervals. In a case of frequency multiplexing of the discrete spectrum signals with different subcarrier intervals, orthogonality between the subcarriers is destroyed. Accordingly, the interference occurs between the uplink signals from the terminal apparatuses 2A and 2B even in a case that the base station apparatus 1 configures the scheduling information not to overlap the subcarrier frequencies of the terminal apparatuses 2A and 2B.

Figure 11A:
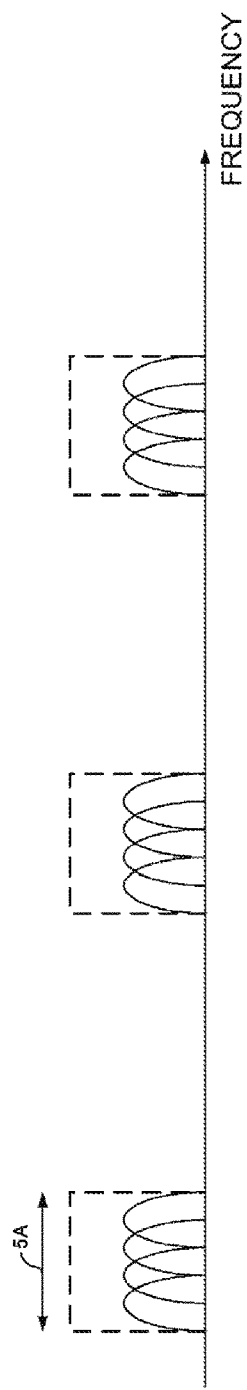
FIG. 11A and FIG. 11B are diagrams illustrating examples of a signal spectrum according to an aspect of the present embodiment.

The transmitter 203 of the terminal apparatus 2 according to the present embodiment may apply a bandlimiting filter to each of the spectrum sets of the discrete spectrum signals as illustrated in FIGS. 10A and 10B. FIGS. 11A and 11B, FIGS. 10A and 10B according to the present embodiment are, schematic diagrams illustrating examples of the discrete spectrum signal generated by the transmitter 203 of the terminal apparatus 2 according to the present embodiment. FIG. 11A only illustrates discrete spectrum signal 6A of the terminal apparatus 2. As illustrated in FIG. 11A, the transmitter 203 of the terminal apparatus 2 according to the present embodiment may apply the bandlimiting filter with passband width 5A to each of the spectrum sets. Note that the relationship between the passband width 5A and the bandwidth 3A of the spectrum set is established so long as the bandwidth 3A is larger than the passband width 5A. To satisfy such relationship, the transmitter 203 according to the present embodiment may apply the bandlimiting filter, and in this case, the number of subcarriers contained in the spectrum set can be made smaller than the number of subcarriers in a case of not applying the bandlimiting filter. Note that a method of applying the bandlimiting filter to the spectrum set by the terminal apparatus 2 is not limited to any method. For example, the terminal apparatus 2 can realize the band limitation by multiplying the spectrum set by weighting factors in a frequency domain. For example, the terminal apparatus 2 can realize the band limitation by convolutional arithmetic operation of the weighting factors in a time domain to the discrete spectrum signal with the spectrum set.

Figure 11B:
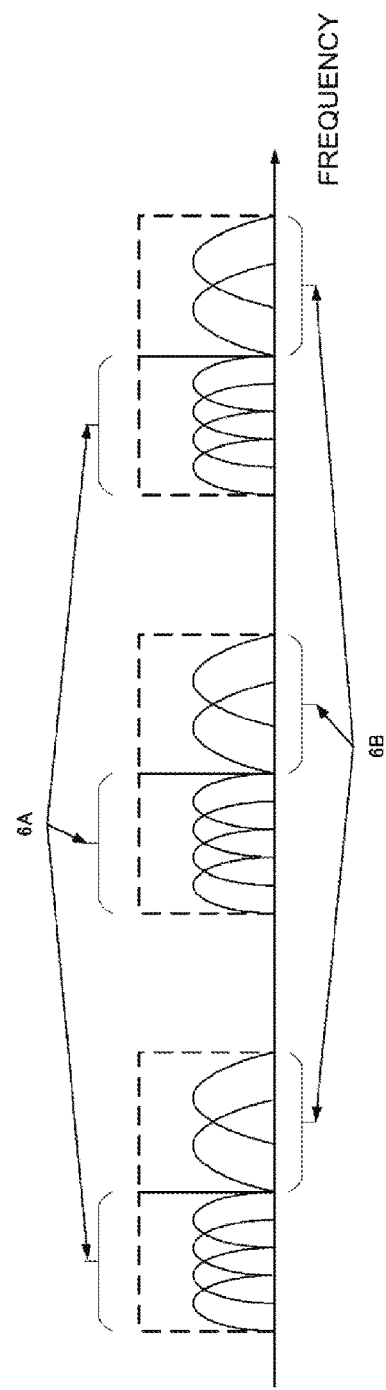

FIG. 11B illustrates the frequency multiplexed discrete spectrum signals of the two terminal apparatuses 2 (terminal apparatuses 2A and 2B). FIG. 11B illustrates a case under the assumption that the subcarrier interval configured for the discrete spectrum signal 6B of the terminal apparatus 2B is larger than the subcarrier interval configured for the discrete spectrum signal 6A of the terminal apparatus 2A. The bandlimiting filters are applied to the respective spectrum sets of the discrete spectrum signals 6A and 6B. The transmitter 203 of the terminal apparatus 2 applies the bandlimiting filters to the spectrum sets, and thus reduce the mutually exerted interference power resulting from frequency multiplexing of the discrete spectrum signals with differently configured subcarrier intervals. Accordingly, the terminal apparatus 2 according to the present embodiment may be frequency multiplexed with other terminal apparatus 2 even in a case that the frame formats with different subcarrier intervals are configured.

Note that, in FIG. 11B, the bandwidth occupied by the spectrum set of the terminal apparatus 2A is the same as the bandwidth occupied by the spectrum set of the terminal apparatus 2B. The bandwidths of the spectrum sets of the terminal apparatuses 2A and 2B is not needed to be coincided with each other. For example, in a case that the bandwidth of the spectrum set of the terminal apparatus 2A is A (Hz), the terminal apparatus 2B may be configured with the bandwidth of the spectrum set of 2×A (Hz). It is needless to say that the relationship of the bandwidth of the spectrum set between the terminal apparatuses 2 is not limited to an integer multiple relation. Note that it is needless to say that the number of the subcarriers contained in the spectrum set may be different between the terminal apparatuses 2.

Note that FIG. 11B illustrates that the frequency interval between the spectrum sets of the terminal apparatus 2A is the same as the frequency interval of the terminal apparatus 2B. However, the respective frequency intervals between the spectrum sets of the terminal apparatuses 2A and 2B according to the present embodiment is not needed to be coincided with each other. For example, in a case that the frequency interval between the spectrum sets of the terminal apparatus 2A is A (Hz), the terminal apparatus 2B may be configured with the frequency interval between the spectrum sets, 2×A (Hz). It is needless to say that the relationship of the frequency intervals between the spectrum sets of the terminal apparatuses 2 is not limited to the integer multiple relationship.

Note that FIG. 11B illustrates that the occupied bandwidth of the discrete spectrum signal of the terminal apparatus 2A is the same as the occupied bandwidth of the terminal apparatus 2B. However, the respective occupied bandwidths of the discrete spectrum signals of the terminal apparatuses 2A and 2B according to the present embodiment is not needed to be coincided with each other. For example, in a case that the occupied bandwidth of the discrete spectrum signal of the terminal apparatus 2A is A (Hz), the occupied bandwidth of the discrete spectrum signal of the terminal apparatus 2B may be configured to 2×A (Hz). It is needless to say that the relationship of the occupied bandwidth of the discrete spectrum signal between the terminal apparatuses 2 is not limited to the integer multiple relationship. Note that the occupied bandwidth of the discrete spectrum signal may be defined as the sum of frequencies of the actually allocated discrete spectrum signals. The occupied bandwidth of the discrete spectrum signal may be defined as the difference between the frequency of the subcarrier allocated at the lowest frequency and the frequency of the subcarrier allocated at the highest frequency among the multiple subcarriers with the discrete spectrum signals.

The above-described occupied bandwidth of the discrete spectrum signal, the bandwidth of the spectrum set, the frequency interval between the spectrum sets, and the number of subcarriers contained in the spectrum set of the terminal apparatus 2 according to the present embodiment may be configured by the base station apparatus 1 for each frame format.

The terminal apparatus 2A may select application/non-application of the bandlimiting filter to the discrete spectrum signal to be transmitted by the apparatus itself, based on the frame format configured by the base station apparatus 1, or the frame format selected by the apparatus itself. For example, the terminal apparatus 2A may apply the bandlimiting filter to the discrete spectrum signal in a case that the prescribed frame format is configured by the base station apparatus 1.

The base station apparatus 1 may notify the terminal apparatus 2 of application/non-application of the bandlimiting filter to the discrete spectrum signal. For example, the base station apparatus 1 can configure application of the bandlimiting filter to the discrete spectrum signal in addition to configuration of the prescribed frame format of the terminal apparatus 2. In a case that the subcarrier interval configured for the frame format of the terminal apparatus 2A is configured to be larger than the subcarrier interval configured for the frame format of the terminal apparatus 2B by integer multiples, the terminal apparatus 2A configured with the smaller subcarrier interval is likely to be much influenced by the inter-channel interference between neighboring channels from the discrete spectrum signal of the terminal apparatus 2B allocated near the discrete spectrum signal of the terminal apparatus 2A. In contrast, the terminal apparatus 2B is not so much influenced by the inter-channel interference between neighboring channels from the discrete spectrum signal of the terminal apparatus 2A. In this case, the terminal apparatus 2 to apply the bandlimiting filter to the discrete spectrum signal is the terminal apparatus 2B. Accordingly, the base station apparatus 1 may apply the bandlimiting filter only to the terminal apparatus 2 with the prescribed frame format (in the above-described example, the frame format with larger subcarrier interval between the two frame formats with the subcarrier intervals in integer multiple relations). Of course, the terminal apparatus 2 may determine whether the bandlimiting filter is applied, based on the configured frame format. Note that it can be said that the transmit waveforms are different between a case of application and a case of non-application of the bandlimiting filter. Note that the transmit waveform resulting from non-application of the bandlimiting filter is also referred to as a first transmit waveform, and the transmit waveform resulting from non-application of the bandlimiting filter is also referred to as a second transmit waveform. In this case, the base station apparatus 1 can instruct or configure either the first transmit waveform or the second transmit waveform for the prescribed frame format.

In the case that the subcarrier intervals for multiple frame formats configurable by the terminal apparatus 2 according to the present embodiment are in integer multiple relations to one another, and the frame format with the smallest subcarrier interval is configured, the terminal apparatus 2 is not needed to apply the bandlimiting filter to the discrete spectrum signal.

The base station apparatus 1 may determine whether the discrete spectrum signal of the terminal apparatus 2 with differently configured frame formats is frequency multiplexed. The base station apparatus 1 may frequency multiplexes the discrete spectrum signals of the terminal apparatus 2 with the frame format configured to have the same subcarrier interval. In a case that the discrete spectrum signal of the terminal apparatus 2 is configured to be applied with the bandlimiting filter, the base station apparatus 1 can frequency multiplex the discrete spectrum signal of the terminal apparatus 2 even in a case of difference subcarrier interval of the frame format configured for the terminal apparatus 2.

The discrete spectrum signal generated by the terminal apparatus 2 may have a waveform of a single carrier signal. The terminal apparatus 2 according to the present embodiment can generate the discrete spectrum signal with the waveform of the single carrier signal, for example, the block interleaved frequency division multiplexing access (B-IFDMA) signal, the clustered DFT spread OFDM (Clustered-DFT-s-OFDM) signal.

The discrete spectrum signal generated by the terminal apparatus 2 may have a waveform of a multicarrier signal. The terminal apparatus 2 according to the present embodiment can generate the discrete spectrum signal with the waveform of the multicarrier signal, for example, the OFDM signal, the Filtered OFDM signal, the Filter-bank multicarrier signal and the like.

The base station apparatus 1 can frequency multiplex the terminal apparatuses 2 which generate the discrete spectrum signals with waveforms different from each other.

The base station apparatus 1 according to the present embodiment can limit the frame format used in the unlicensed band to one prescribed format. The base station apparatus 1 can periodically change the prescribed one frame format used in the unlicensed band. The base station apparatus 1 can configure the one frame format for the frame transmitted in the frequency bandwidth for carrier sense (the bandwidth for CC in a case that carrier sense is performed for each CC with, for example, 20 MHz bandwidth). In the case of changing the frame format for transmission in the carrier sensed CC, the base station apparatus 1 according to the present embodiment can change the frame format after performing another carrier sense.

For the purpose of synchronizing the Pcell and Scell, the base station apparatus 1 according to the present embodiment can configure the frame format configured for the Pcell to be the same as the frame format for the Scell.

In a case of carrier aggregation of the multiple CCs in the unlicensed band, the base station apparatus 1 can configure the same frame format for the multiple CCs for carrier aggregation. In this case, the carrier sense is performed to the radio medium to which the base station terminal 1 transmits the multiple CCs while one of the multiple CCs serving as a primary channel, and the other being associated with the carrier sense performed by the base station apparatus 1 relative to the radio medium on which the primary channel is transmitted. Specifically, the contention window to be described below is considered in a case of performing the carrier sense by the base station apparatus 1 through the primary channel. Meanwhile, consideration of the contention window is not necessary in a case of performing the carrier sense through other CC.

In the case of carrier aggregation of the multiple CCs in the unlicensed band, the base station apparatus 1 can configure the frame format which is different for each of the carrier aggregated CCs. In this case, the base station apparatus 1 can perform carrier sense for the radio media on which the base station apparatus 1 transmits the multiple CCs independently to the radio media on which the multiple CCs are transmitted. In a case that the base station apparatus 1 transmits the two CCs with the bandwidth of 20 MHz through carrier aggregation, and configures different frame formats for the two CCs, the base station apparatus 1 can perform carrier sense in consideration of the contention window to be performed for the radio media with bandwidth of 20 MHz for transmitting the two CCs.

Figure 16:
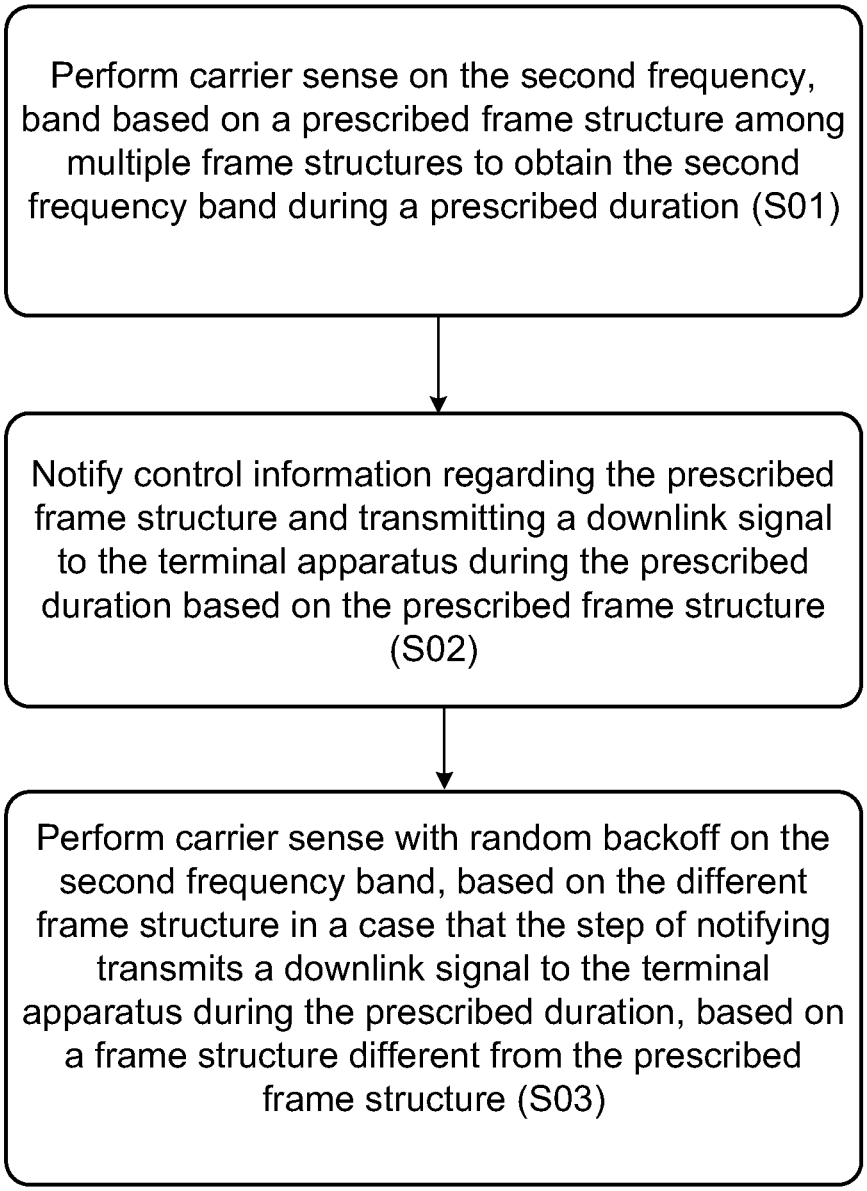
FIG. 16 is a flowchart illustrating a method by a base station apparatus according to an aspect of the present embodiment.

The base station apparatus 1 communicates with the terminal apparatus 2 using a communication method or system that a first frequency band used in a dedicated manner is applied to a second frequency band that is different from the first frequency band. FIG. 16 is a flowchart illustrating a method by a base station apparatus according to an aspect of the present embodiment. As illustrated in FIG. 16, the receiver 104 of the base station apparatus 1 is configured to perform carrier sense on the second frequency band based on a prescribed frame structure among multiple frame structures to obtain the second frequency band during a prescribed duration (step S01), and the transmitter 103 of the base station apparatus 1 is configured to notify control information regarding the prescribed frame structure and transmit a downlink signal to the terminal apparatus 2 during the prescribed duration based on the prescribed frame structure (step S02). In a case that the transmitter 103 transmits a downlink signal to the terminal apparatus 2 during the prescribed duration based on a frame structure different from the prescribed frame structure, the receiver 104 performs carrier sense with random backoff on the second frequency band, based on the different frame structure (step S03).

Figure 17:
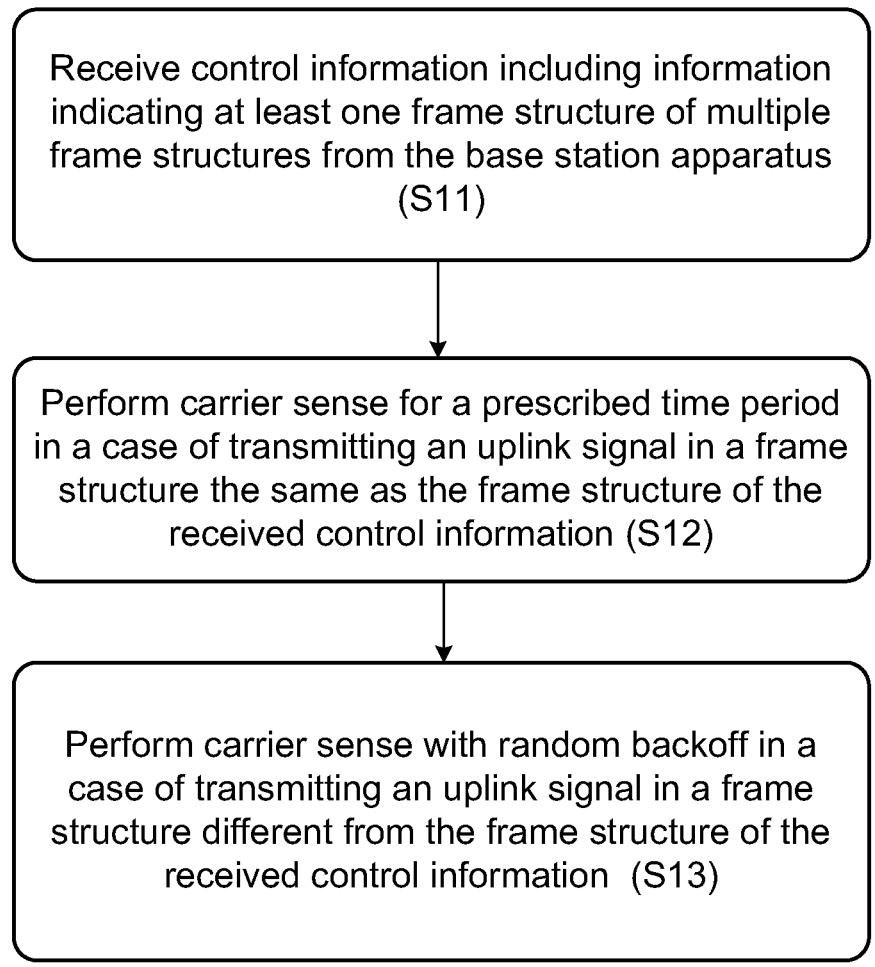
FIG. 17 is a flowchart illustrating a method by a terminal apparatus according to an aspect of the present embodiment.

FIG. 17 is a flowchart illustrating a method by a terminal apparatus according to an aspect of the present embodiment. As illustrated in FIG. 17, the receiver 204 of the base station apparatus 2 is configured to receive control information including information indicating at least one frame structure of multiple frame structures from the base station apparatus 1 (step S11). The transmitter 203 of the base station apparatus 2 is configured to perform carrier sense for a prescribed time period in a case of transmitting an uplink signal in a frame structure the same as the frame structure of the received control information (step S12), and performs carrier sense with random backoff in a case of transmitting an uplink signal in a frame structure different from the frame structure of the received control information (step S13).

The configurable frame structure may be limited by the base station apparatus 1 in accordance with the bandwidth of the CC. For example, the base station apparatus 1 may include, to configurable frame structure sets, the frame structure that cannot be configured for the bandwidth of the CC being equal to or narrower than a prescribed value.

The radio medium may be secured by the base station apparatus 1 according to the present embodiment through carrier sense by a prescribed tune length. The radio medium may be secured by the base station apparatus 1 according to the present embodiment through carrier sense by an amount corresponding to Maximum Channel Occupancy Time (MCOT). The base station apparatus 1 can allow the transmitter 103 to transmit the signal in the secured MCOT. The base station apparatus 1 can configure the schedule information for the terminal apparatus 2 so that the uplink signal is transmitted to the terminal apparatus 2 in the secured MCOT.

The base station apparatus 1 can determine the MCOT size acquirable for each channel access priority class (priority, priority order, QoS class). FIG. 13 is a table representing a relationship between the channel access priority class and the MCOT according to the present embodiment. Referring to FIG. 13, mp denotes a parameter relating to the standby period (Defer duration). As the nip becomes larger, the waiting period for the base station apparatus 1 from the start of carrier sense is made longer. Each of CWmin,p and CWmax,p denotes the parameter (Contention window: CW, or simply the counter N) relating to the transmission standby conducted based on the value randomly selected by the base station apparatus 1. The base station apparatus 1 can randomly select the value N from 0 to CWp. The value of CWp is selected from the CWmin,p to CWmax,p. Basically, as those parameters take larger values, the transmission standby period for the base station apparatus 1 is prolonged. Note that the parameters illustrated in the table of FIG. 13 are mere examples. It is possible to further include the information relating to the value possibly taken by the CWp in the table of FIG. 13.

As illustrated in FIG. 13, the MCOT length acquirable by the base station apparatus 1 is different for each of the channel access priority classes. Normally, as the channel access priority class includes longer overhead (e.g., transmission standby period, Defer duration, or random backoff time) required from the start of carrier sense to actual transmission of the signal, the longer MCOT may be acquired.

The MCOT size acquirable by the base station apparatus 1 according to the present embodiment is different for each of the frame structures to be configured. For example, it is possible to configure so that the selectable channel access priority class is different for each of the frame structures configured by the base station apparatus 1. For example, the channel access priority class may be configured for each of the frame structures configured by the base station apparatus 1. For example, the base station apparatus 1 can configure the parameters (e.g., mp, CWmin,p, CWmax,p) for acquiring the MCOT for each of the frame structures to be configured. With such control, the base station apparatus 1 can control the size of the MCOT to be acquired, and the priority of acquiring the MCOT for each of the frame structures. Therefore, it is possible to control the QoS of the communication system more flexibly.

In the MCOT acquired in the mode in which a certain frame structure is configured, the base station apparatus 1 according to the present embodiment can transmit the signal with the frame structure. Meanwhile, in the MCOT acquired in the mode that the certain frame structure is configured, the base station apparatus 1 according to the present embodiment can be configured so as to prevent transmission of the signal with the frame structure other than the certain frame structure. Under such control, the base station apparatus 1 can control the frame structure configured for the frame transmitted within the acquired MCOT. Accordingly, it is possible to efficiently use the radio medium acquired only in the MCOT.

In a case that, in the MCOT acquired in the mode that the certain frame structure is configured, the frame structure different from the certain frame structure is configured, the base station apparatus 1 according to the present embodiment can perform carrier sense again to newly acquire the MCOT. Note that, in this case, the base station apparatus 1 may cancel or hold the previously acquired MCOT.

In a case that, in the MCOT acquired in the mode that the certain frame structure is configured, the schedule information is configured for the terminal apparatus 2 so that the uplink signal is transmitted to the terminal apparatus 2, the base station apparatus 1 according to the present embodiment can configure the certain frame structure for the terminal apparatus 2 for transmission in accordance with the scheduling.

Assuming the OFDM symbol length, the SC-FDMA symbol length, the subframe length, the frame length and the like as the prescribed time unit, the base station apparatus 1 according to the present embodiment can configure the non-transmit period (null period) with the length that is the integer multiple or real number multiple of the prescribed unit to the frame format transmitted by the apparatus itself. In other words, the base station apparatus 1 according to the present embodiment can configure the non-transmit period with the prescribed duration between the prescribed signal transmit periods. In this case, the base station apparatus 1 according to the present embodiment can configure the length of the null period, or the length of the signal transmit period to a different value for each of the frame formats. Note that, in the case that the base station apparatus 1 transmits the multiple component carriers with the frame formats each configured to have the different null period length, it is possible to configure the null period length to be longer than the prescribed time length.

It is possible to use one of the time units defined for the respective frame formats configured by the basic station apparatus 1 (time boundary, frame boundary, subframe boundary, symbol boundary, block boundary, standard time, reference time) as the null period length or the signal transmit period length. It is possible to use the OFDM symbol length, the SC-FDMA symbol length, the subframe length, the frame length, the slot length and the like as the time unit. For example, in a case of presence of two subframe boundaries (which may be the boundary of the head time of the frame, or boundary of the end time of the frame) in the null period, the null period may be expressed to include the subframe boundary which appears twice.

FIGS. 14A to 14D are schematic diagrams illustrating examples of the frame format according to the present embodiment. FIGS. 14A and 14B illustrate the different frame formats being configured. Note that it is assumed that an MCOT 14A acquired by the base station apparatus 1 through carrier sense is common regardless of the frame format. As illustrated in FIGS. 14A to 14D, each of null periods 14B and 14C given to the respective frame formats by the base station apparatus 1 according to the present embodiment may take a different value depending on the frame format. In this case, the base station apparatus 1 can configure each number of the OFDM symbols or the subframes, which can be contained in the null periods 14B and 14C to be the same value.

The null period given to the frame format by the base station apparatus 1 may be defined as the value which is the integer or real number multiple of the prescribed time unit defined for each of the frame formats, for example, the OFDM symbol length, the subframe length, the time slot length, and the like. For example, in a case that the null period given to the frame format by the base station apparatus 1 is configured to be 0.5 times the OFDM symbol length, the base station apparatus 1 can configure the null period given to the frame format constantly to be 0.5 times the OFDM symbol length defined for each of the frame formats regardless of the frame format to be configured. With such control, the base station apparatus 1 can configure different frame formats and thus configure different null period. Configuring the different frame formats by the base station apparatus 1 allows the change of the configurable time length as the null period.

Assuming the OFDM symbol length, the SC-FDMA symbol length, the subframe length, the frame length and the like as the prescribed time unit (standard unit), the base station apparatus 1 according to the present embodiment can configure the non-transmit period (null period) with the length being an integer or real number multiple of the prescribed unit to the frame format transmitted by the apparatus itself. In this case, the base station apparatus 1 according to the present embodiment can configure the null period length to be the same value for each of the frame formats.

FIGS. 14C and 14D illustrate the different frame formats configured by the base station apparatus 1. Symbol lengths 14F and 14G represent the OFDM symbol lengths defined for each of the frame formats configured by the base station apparatus 1. In FIGS. 14C and 14D, it is assumed that MCOTs 14D acquired by the base station apparatus 1 have the same length.

The base station apparatus 1 according to the present embodiment can configure the number of standard units which can be contained in the null period 14E to be a different value for each of the different frame formats. Taking FIGS. 14C and 14D as examples, the base station apparatus 1 can configure the number of symbols which can be contained in the null period 14E given to the frame format with the symbol length 14F as illustrated in FIG. 14C to be a value different from the number of symbols which can be contained in the null period 14E given to the frame format with a symbol length 14G as illustrated in FIG. 14D. With such control, even in the case of the differently configured frame formats, the base station apparatus 1 can configure the null periods with the same length to the respective frame formats. With such control, the base station apparatus 1 according to the present embodiment can perform carrier sense constantly for the same time length in the null period regardless of the configured frame format. For example, even in the case of transmitting the carrier aggregated CCs with the differently configured frame formats, the base station apparatus 1 can configure the null period with the same time length to the respective CCs. Accordingly, carrier sense may be performed for the radio medium on which the multiple CCs are transmitted for the period with the same time length. Note that, referring to FIGS. 14A to 14D, especially to FIGS. 14C and 14D, the signal transmit period for which the signal is actually transmitted by the base station apparatus 1 is separated by the symbol length. But the time unit of the signal transmit period is not limited to the symbol length, but may be defined by, for example, the block length, the frame length, the subframe length, the slot length and the like.

Note that, as described above, the base station apparatus 1 according to the present embodiment can configure the number of the frame boundaries which can be configured in the non-transmit period to be a different value for each of the frame formats. The base station apparatus 1 according to the present embodiment appropriately configures the number of frame boundaries configured in the non-transmit period for each of the frame formats, so that each time length of the non-transmit period which can be provided for the respective frame formats can be configured equal to or larger than the prescribed value. With such control, in the case that the base station apparatus 1 transmits the multiple CCs each with differently configured frame format through carrier aggregation, it is possible to avoid the problem that only the specific CC fails to secure the prescribed carrier sense period because of the short null period.

Note that, for alignment of the null period start timing in transmission of the multiple CCs each with differently configured frame format through carrier aggregation, the base station apparatus 1 according to the present embodiment can make the value of the number of frames, the number of symbols, the number of subframes, the number of slots and the like contained in a signal transmit period 14H different in accordance with the frame format configured by the base station apparatus 1. For example, values of the number of frames, the number of symbols, the number of subframes, the number of slots and the like, which are actually transmitted by the base station apparatus 1 in the signal transmit period while having the frame format configured by the base station apparatus 1 as illustrated in FIG. 14C may be configured to be different from those in the case of the frame format configured by the base station apparatus 1 as illustrated in FIG. 14D.

For alignment of the null period start timing in transmission of the multiple CCs each with differently configured frame format for each CC through carrier aggregation, the base station apparatus 1 according to the present embodiment can configure the Partial subframe formed by defining a part of the subframe as the null period, as the head subframe, the end subframe or both the start and end subframes in the signal transmit period. In other words, the base station apparatus 1 according to the present embodiment may be operated to transmit 3.5 subframes in the signal transmit period. In this case, the Partial subframes are not needed to be aligned among the multiple CCs to be carrier aggregated by the base station apparatus 1. For example, in a case that the base station apparatus 1 transmits the CC with two differently configured frame formats of CC1 and CC2 through carrier aggregation, it is possible to configure the CC1 so that the Partial subframe serves as the head subframe in the signal transmit period. Meanwhile, it is possible to configure the CC2 so that the Partial subframe serves as the end subframe in the signal transmit period.

Note that the base station apparatus 1 can notify the terminal apparatus 2 of the information whether the subframe configured as the final subframe in the signal transmit period is the Partial subframe, and the information of the number of symbols or slots actually contained in the Partial subframe for each of the frame formats configured by the base station apparatus 1. The base station apparatus 1 can include the control information transmitted by the Partial subframe itself or the subframe just before the Partial subframe, in the information relating to the Partial subframe. Alternatively, the base station apparatus 1 can include the control information transmitted by the head subframe in the signal transmit period in the information relating to the Partial subframe.

The base station apparatus 1 according to the present embodiment can notify the terminal apparatus 2 of the scheduling information. The scheduling information contains the radio resource information allocated to the terminal apparatus 2. The base station apparatus 1 according to the present embodiment can perform Multi subframe scheduling (MSS) for collectively notifying the terminal apparatus 2 of the scheduling information with respect to the subframes continuously allocated in a time direction.

Figure 15:
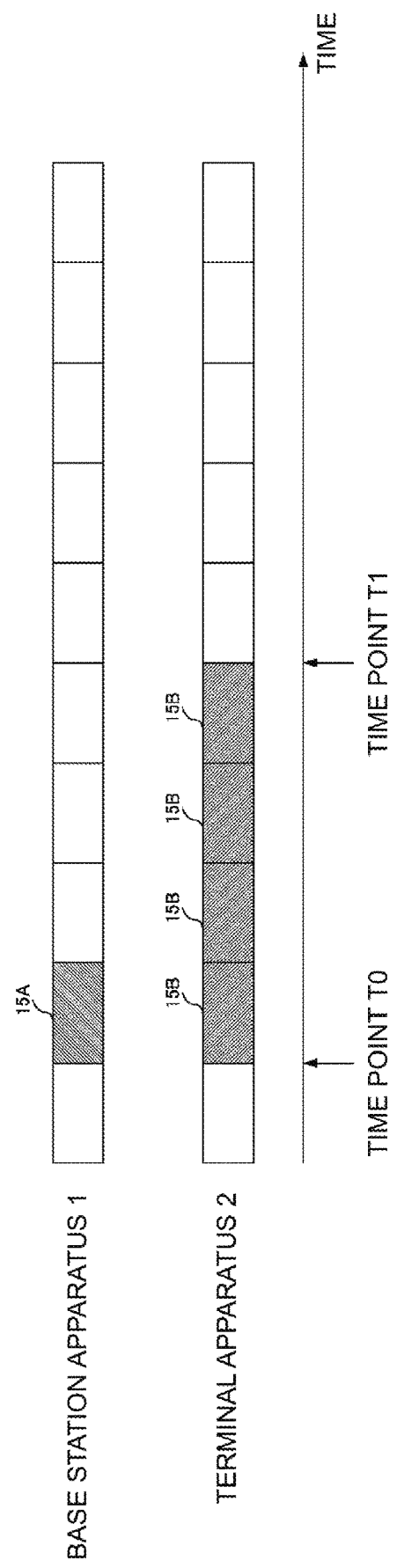
FIG. 15 is a diagram illustrating an example of a scheduling method according to an aspect of the present embodiment.

FIG. 15 is a schematic diagram illustrating an example of a multi subframe scheduling according to the present embodiment. Referring to FIG. 15, transmit signals of the base station apparatus 1 and the terminal apparatus 2 are separated in a subframe unit. The method according to the present embodiment is not limited to this definition. The base station apparatus 1 according to the present embodiment can include, in a downlink signal 15A to be transmitted at a time T0, the scheduling information relating to an uplink signal 15B that can be transmitted by the terminal apparatus 2A until a time T1. For example, the downlink signal 15A contains the information indicating the transmit timing at which the uplink signal 15B may be actually transmitted by the terminal apparatus 2.

The base station apparatus 1 according to the present embodiment can configure the number of the uplink signals 15B that can be controlled by the scheduling information contained in the downlink signal 15A, based on the frame format configured by the base station apparatus 1. The unit of the number of the uplink signals 15B controlled by the scheduling information contained in the downlink signal 15A is defined in the non-restricted manner. Not only the number of subframes as illustrated in FIG. 15, but also the number of frames, the number of symbols, and the number of slots may be defined as the unit of the number. That is, in a case that the time difference between time T0 and time T1 is kept constant, the base station apparatus 1 according to the present embodiment includes the number of frames, the number of symbols, the number of subframes, the number of slots and the like configured in the period between the time T0 and time T1 variable in accordance with the frame format configured by the base station apparatus 1.

Note that the information contained in the scheduling information transmitted while having a certain frame format configured by the base station apparatus 1 according to the present embodiment may contain the scheduling information for transmission of the uplink signal while having the specific frame format configured by the terminal apparatus 2. Taking FIG. 15 as an example, the base station apparatus 1 can configure the scheduling information contained in the downlink signal 15A to serve as the information relating to the uplink signal 15B configured with the same frame format as the downlink signal 15A.

Note that the information contained in the scheduling information transmitted by the base station apparatus 1 according to the present embodiment in the mode having a certain frame format configured may simultaneously contain the scheduling information for transmitting the uplink signal by the terminal apparatus 2 in the mode having multiple frame formats including the certain frame format configured. Taking FIG. 15 as an example, the base station apparatus 1 can allow the scheduling information contained in the downlink signal 15A to contain not only the information relating to the uplink signal 15B having the same frame format as that of the downlink signal 15A configured, but also the information relating to the uplink signal 15B configured with the frame format different from that of the downlink signal 15A. The base station apparatus 1 can notify the terminal apparatus 2 of the information relating to the frame format associated with the scheduling information contained in the downlink signal 15A. Note that, in a case that the base station apparatus 1 include the scheduling information which contains the scheduling information associated with multiple frame formats as well, the number of information items contained in the scheduling information associated with the respective frame formats (e.g., the number of subframes which can be notified to the terminal apparatus 2 with the single scheduling information) may be varied for each of the frame formats.

The base station apparatus 1 according to the present embodiment allows the cycle for retransmitting the downlink signal (the period of time elapsing from when the initial transmit signal is transmitted until the retransmit signal is transmitted) to the common to the multiple frame formats. The base station apparatus 1 according to the present embodiment can configure at least one of the number of frames, the number of subframes, the number of symbols, and the number of slots, which are contained in the cycle for retransmitting the downlink signal (the time elapsing from when the initial transmit signal is transmitted until the retransmit signal is transmitted) to be the different value for each of the frame formats. With such control, the base station apparatus 1 allows transmission of the retransmit signal at the fixed timing constantly regardless of the frame format to be configured.

The base station apparatus 1 according to the present embodiment can configure the time at which the terminal apparatus 2 transmits the information indicating reception success/failure of the downlink signal (ACK signal or NACK signal) while being contained in the uplink signal. The base station apparatus 1 according to the present embodiment can configure at least one of the number of frames, the number of subframes, the number of symbols, and the number of slots that the terminal apparatus 2 transmits or receives from the time when the base station apparatus 1 has transmitted the downlink signal associated with the information indicating reception success/failure to the time when the terminal apparatus 2 transmits the signal containing the information indicating the reception success/failure, to be a different value for each of the frame formats.

2. Matters Common to Entire Embodiments

Note that the base station apparatus and the terminal apparatus according to an aspect of the present invention are not limited to a licensed band, and can be used in a Radio access technology (RAT) operated in an unlicensed band. The RAT operated in the unlicensed band may be a license-assisted access which is assisted by the licensed band.

The base station apparatus and the terminal apparatus according to an aspect of the present invention can be used in Dual connectivity (DC) in which signals are transmitted (or received) from multiple transmission points (or multiple reception points) The base station apparatus and the terminal apparatus can be used in communication with at least one of multiple transmission points (or reception points) connected in DC.

The base station apparatus and the terminal apparatus according to an aspect of the present invention can be used in carrier aggregation (CA) in which multiple component carriers (CCs) are used. The base station apparatus and the terminal apparatus can be used only for the primary cell among the multiple CCs to be aggregated in CA, can be used only for the secondary cell(s), and can be used both the primary cell and the secondary cell(s).

The present invention can also adopt the following aspects.

(1) Specifically, a terminal apparatus according to an aspect of the present invention is a terminal apparatus for communicating with a base station apparatus in a communication system that applies a communication method applied to a first frequency band used in a dedicated manner to a second frequency band different from the first frequency band, the base station apparatus including: a receiver configured to receive information indicating at least one frame structure of multiple frame structures from the base station apparatus; and a transmitter configured to generate a discrete spectrum signal, based on the frame structure, and multiply each of multiple spectrum sets included in the discrete spectrum signal by a weight coefficient to transmit a resultant.

(2) The terminal apparatus according to an aspect of the present invention is the terminal apparatus described in the above (1), wherein the transmitter configures at least any one of an occupied bandwidth of the discrete spectrum signal, an occupied bandwidth of the spectrum set, the number of subcarriers included in the spectrum set, and a frequency spacing between the multiple spectrum sets to a value different for each frame structure.

(3) The terminal apparatus according to an aspect of the present invention is the terminal apparatus described in the above (1), wherein in a case that the information indicating the frame structure indicates a prescribed frame structure, the transmitter does not multiply each of the multiple spectrum sets by the weight coefficient.

(4) The terminal apparatus according to an aspect of the present invention is the terminal apparatus described in the above (1), wherein the receiver acquires, from the base station apparatus, information indicating whether or not the transmitter multiplies each of the multiple spectrum sets by the weight coefficient.

(5) A base station apparatus according to an aspect of the present embodiment is a base station apparatus for communicating with multiple terminal apparatuses in a communication system that applies a communication method applied to a first frequency band used in a dedicated manner to a second frequency band different from the first frequency band, the base station apparatus including: a transmitter configured to notify control information for notifying at least one frame structure of multiple frame structures to each of the multiple terminal apparatus, and scheduling information indicating a radio resource on which each of the multiple terminal apparatuses transmits an uplink signal in the second frequency band, wherein the scheduling information includes allocation information of a radio resource on which frequency-multiplexed are uplink signals of the multiple terminal apparatuses configured with different frame structures.

(6) The base station apparatus according to an aspect of the present invention is the base station apparatus described in the above (5), further including a scheduling unit configured to configure the maximum number of the multiple terminal apparatuses frequency-multiplexed, based on the frame structures configured for the multiple terminal apparatuses.

(7) The base station apparatus according to an aspect of the present invention is the base station apparatus described in the above (5), wherein the uplink signal transmitted by each of the terminal apparatuses is a discrete spectrum signal, and the transmitter notifies each of the terminal apparatuses of control information for indicating multiplication of a spectrum set included in the discrete spectrum signal of each of the terminal apparatuses by a weight coefficient.

(8) A communication method according to an aspect of the present invention is a communication method for a terminal apparatus for communicating with a base station apparatus in a communication system that applies a communication method applied to a first frequency band used in a dedicated manner to a second frequency band different from the first frequency band, the communication method including the steps of: receiving information indicating at least one frame structure of multiple frame structures from the base station apparatus; and generating a discrete spectrum signal, based on the frame structure, and multiplying each of multiple spectra sets included in the discrete spectrum signal by a weight coefficient to transmit a resultant.

A program running on an apparatus according to an aspect of the present invention may serve as a program that controls a Central Processing Unit (CPU) and the like to cause a computer to operate in such a manner as to realize the functions of the embodiments according to the present invention. Programs or information handled by the programs are temporarily stored in a volatile memory, such as a Random Access Memory (RAM), or in a non-volatile memory, such as a flash memory, or a Hard Disk Drive (HDD), or other storage device systems.

Note that the programs to realize the functions of the embodiment of the present invention may be recorded on a computer-readable recording medium. The functions may be realized by causing a computer system to read the programs recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically holding programs in a short period, and other computer-readable recording medium.

Furthermore, each functional block or various characteristics of the apparatuses used in the above-described embodiments may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, and may be a processor of known type, a controller, a micro-controller, or a state machine instead. The above-mentioned electric circuits may be constituted of a digital circuit, or may be constituted of an analog circuit. Furthermore, in a case that with advances in semiconductor technology, a circuit integration technology appears that replaces the present integrated circuits, an aspect or multiple aspects of the present invention can use a new integrated circuit based on the technology.

Note that an aspect of the present patent application and the present invention is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used n a base station apparatus, a terminal apparatus, and a communication method.

REFERENCE SIGNS LIST

The present international application claims priority based on JP 2016-133250 and JP 2016-133251 filed on Jul. 5, 2016, and all the contents of JP 2016-133250 and JP 2016-133251 are incorporated in the present international application by reference.

1, 1A, 1B Base station apparatus
2, 2A, 2B Terminal apparatus
101 Higher layer processing unit
1011 Radio resource control unit
1012 Scheduling unit
102 Controller
103 Transmitter
1031 Coding unit
1032 Modulation unit
1033, 2033 Frame constituting unit
1034 Multiplexing unit
1035 Radio transmitting unit
104 Receiver
1041 Radio receiving unit
1042 Demultiplexing unit
1043 Demodulation unit
1044 Decoding unit
105 Antenna
201 Higher layer processing unit
202 Controller
203 Transmitter
204 Receiver
205 Channel state information generating unit
206 Antenna
2011 Radio resource control unit
2012 Scheduling information interpretation unit
2031 Coding unit
2032 Modulation unit
2034 Multiplexing unit
2035 Radio transmitting unit
2041 Radio receiving unit
2042 Demultiplexing unit
2043 Signal detection unit
2044 Frame interpretation unit
4000 to 4007 Resource
5000 Subframe

The invention claimed is:

1. A base station apparatus for communicating with a terminal apparatus in a communication system that applies a communication method applied to a first frequency band used in a dedicated manner to a second frequency band different from the first frequency band, the base station apparatus comprising:
- a receiver configured to perform carrier sense on the second frequency band based on a prescribed frame structure among multiple frame structures to obtain the second frequency band during a prescribed duration;
- a transmitter configured to notify control information regarding the prescribed frame structure and transmit a downlink signal to the terminal apparatus during the prescribed duration based on the prescribed frame structure, and
- in a case that the transmitter transmits a downlink signal to the terminal apparatus during the prescribed duration, based on a frame structure different from the prescribed frame structure, the receiver performs carrier sense with random backoff on the second frequency band, based on the different frame structure.

2. The base station apparatus according to claim 1, wherein a length of the prescribed duration is associated with the prescribed frame structure.

3. The base station apparatus according to claim 1, wherein priority information of the carrier sense is configured for each of the multiple frame structures.

4. The base station apparatus according to claim 1, wherein
- in a case that the transmitter transmits multiple component carriers in the second frequency band, the transmitter configures the same frame structure for the multiple component carriers.

5. A terminal apparatus for communicating with a base station apparatus in a communication system that applies a communication method applied to a first frequency band used in a dedicated manner to a second frequency band different from the first frequency band, the base station apparatus comprising:
- a receiver configured to receive control information including information indicating at least one frame structure of multiple frame structures from the base station apparatus; and
- a transmitter configured to perform carrier sense for a prescribed time period in a case of transmitting an uplink signal in a frame structure the same as the frame structure of the received control information, and performs carrier sense with random backoff in a case of transmitting an uplink signal in a frame structure different from the frame structure of the received control information.

6. A communication method for a base station apparatus for communicating with a terminal apparatus in a communication system that applies a communication method applied to a first frequency band used in a dedicated manner to a second frequency band different from the first frequency band, the communication method comprising:
- a step of performing carrier sense on the second frequency band based on a prescribed frame structure among multiple frame structures to obtain the second frequency band during a prescribed duration;
- a step of notifying control information regarding the prescribed frame structure and transmitting a downlink signal to the terminal apparatus during the prescribed duration based on the prescribed frame structure, and
- a step of performing carrier sense with random backoff on the second frequency band, based on the different frame structure in a case that the step of notifying transmits a downlink signal to the terminal apparatus during the prescribed duration, based on a frame structure different from the prescribed frame structure.

* * * * *